(12) United States Patent
Maeda et al.

(10) Patent No.: US 7,613,396 B2
(45) Date of Patent: Nov. 3, 2009

(54) MULTIPLEXING COMMUNICATION SYSTEM AND CROSSTALK ELIMINATION METHOD

(75) Inventors: Wakako Maeda, Tokyo (JP); Akio Tajima, Tokyo (JP); Akihiro Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 465 days.

(21) Appl. No.: 11/217,319

(22) Filed: Sep. 2, 2005

(65) Prior Publication Data

US 2006/0045527 A1 Mar. 2, 2006

(30) Foreign Application Priority Data

| Sep. 2, 2004 | (JP) | ............................. 2004-255260 |
| Aug. 23, 2005 | (JP) | ............................. 2005-240782 |

(51) Int. Cl.
*H04J 14/02* (2006.01)
*H04B 10/12* (2006.01)

(52) U.S. Cl. ............................. 398/79; 398/43; 398/68; 398/82; 398/85; 398/140; 398/158; 380/255; 380/256

(58) Field of Classification Search ................... 398/43, 398/68, 79, 82, 85, 140, 158; 380/255, 256
See application file for complete search history.

(56) References Cited

U.S. PATENT DOCUMENTS

| 5,768,378 | A | * | 6/1998 | Townsend et al. | ........... | 380/256 |
| 5,850,441 | A | * | 12/1998 | Townsend et al. | ........... | 380/283 |
| 6,532,324 | B2 | * | 3/2003 | Lupu et al. | .................... | 385/30 |
| 6,895,092 | B2 | * | 5/2005 | Tomita | ...................... | 380/278 |
| 7,340,123 | B1 | * | 3/2008 | Marsden | ...................... | 385/15 |

FOREIGN PATENT DOCUMENTS

| JP | 8-505019 | A | | 5/1996 |
| JP | 2003-37559 | A | | 2/2003 |
| JP | 2003037559 | A | * | 2/2003 |

OTHER PUBLICATIONS

M.S. Goodman, et al., Quantum Cryptography for Optical Networks: A Systems Perspective, 2003, IEEE, pp. 1040-1041.*

G. Ribordy, et al.; "Automated 'plug & play' quantum key distribution"; Electronics Letters; vol. 34, No. 22; Oct. 29, 1998; pp. 2116-2117.

(Continued)

*Primary Examiner*—Ken N Vanderpuye
*Assistant Examiner*—Daniel G Dobson
(74) *Attorney, Agent, or Firm*—Sughrue Mion, PLLC

(57) ABSTRACT

In a system where a quantum channel and a classical channel are multiplexed on a single optical transmission line and information is transmitted from a transmitter to a receiver through the quantum channel, the classical channel is inhibited from affecting the quantum channel. To this end, the transmission characteristics of a transmitter-side wavelength multiplexer/demultiplexer for the classical channel, the transmission characteristics of a receiver-side wavelength multiplexer/demultiplexer for the quantum channel, and the optical power of a light source for the classical channel are designed so that crosstalk light due to spontaneous emission light and crosstalk light due to nonlinear optical effects can be suppressed, and the classical channel does not affect the quantum channel.

8 Claims, 12 Drawing Sheets

OTHER PUBLICATIONS

A. Muller, et al.; ""Plug and play" systems for quantum cryptography"; Applied Physics Letters; vol. 70, No. 7; Feb. 17, 1997; pp. 793-795.

H. Zbinden, et al.; "Interferometry with Faraday mirrors for quantum cryptography"; Electronics Letters; vol. 33, No. 7; Mar. 27, 1997; pp. 586-588.

M. S. Goodman, et al.; "Quantum Cryptography for Optical Networks: A Systems Perspective"; LEOS 2003; vol. QE-14; pp. 1040-1041.

R. J. Runser, et al.; "Quantum Cryptography for Optical Networks and Supporting Metrology"; Optical Fiber Measurements, 2004; Technical Digest: Symposium on Boulder, CO, USA; Sep. 28-30, 2004; Piscataway, NJ, USA; IEEE; Sep. 28, 2004; pp. 159-162.

P. Toliver, et al.; "Impact of Spontaneous Anti-Stokes Raman Scattering on QKD+DWDM Networking"; Lasers and Electro-Optics Society, 2004; LEOS 2004; The 17th Annual Meeting of the IEEE Rio Grande; Puerto Rico; Nov. 8-9, 2004; Piscataway, NJ, USA; IEEE; vol. 2, Nov. 8, 2004; pp. 491-492.

P. D. Townsend, et al.; "Design of quantum cryptography systems for passive optical networks"; Electronics Letters; IEE Stevenage, GB; vol. 30, No. 22; Oct. 27, 1994; pp. 1875- 1877.

* cited by examiner

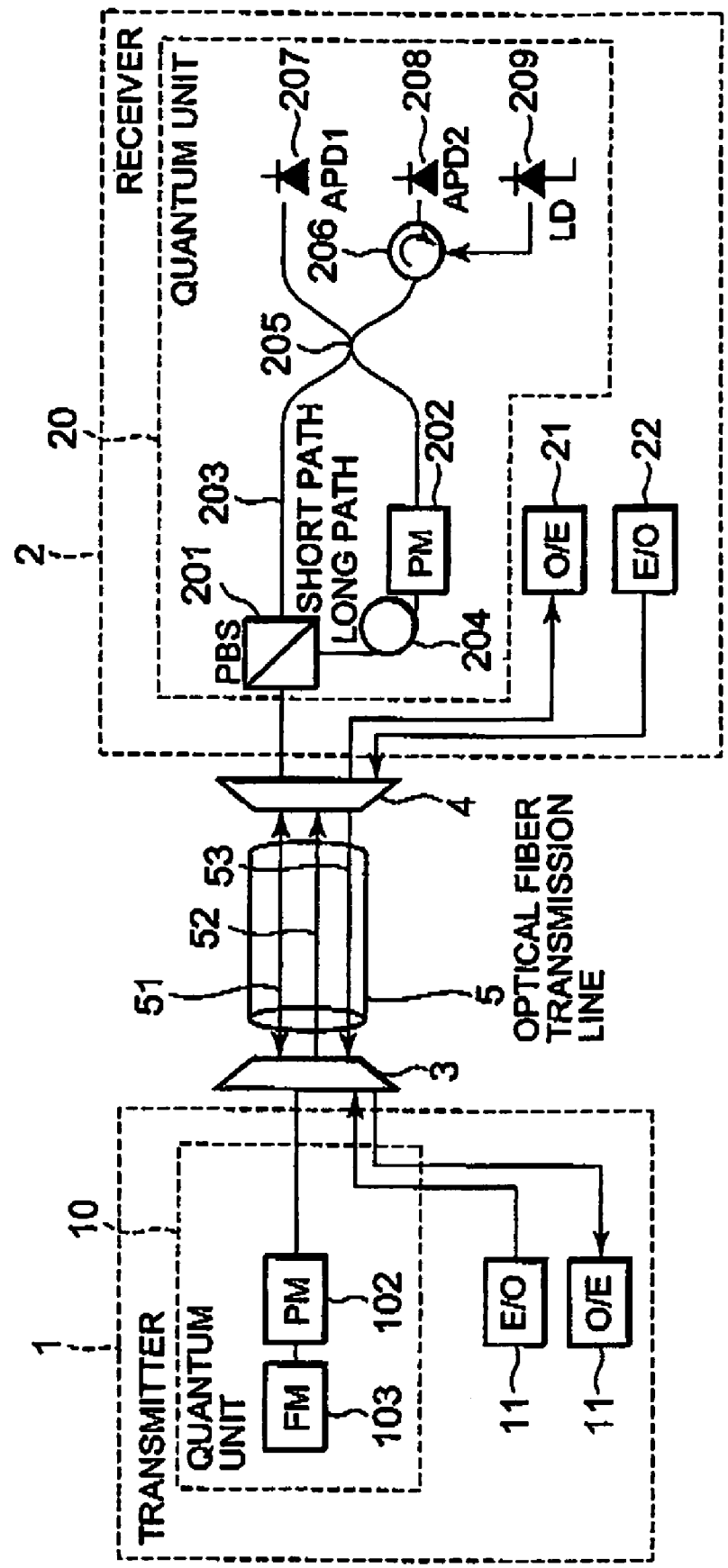

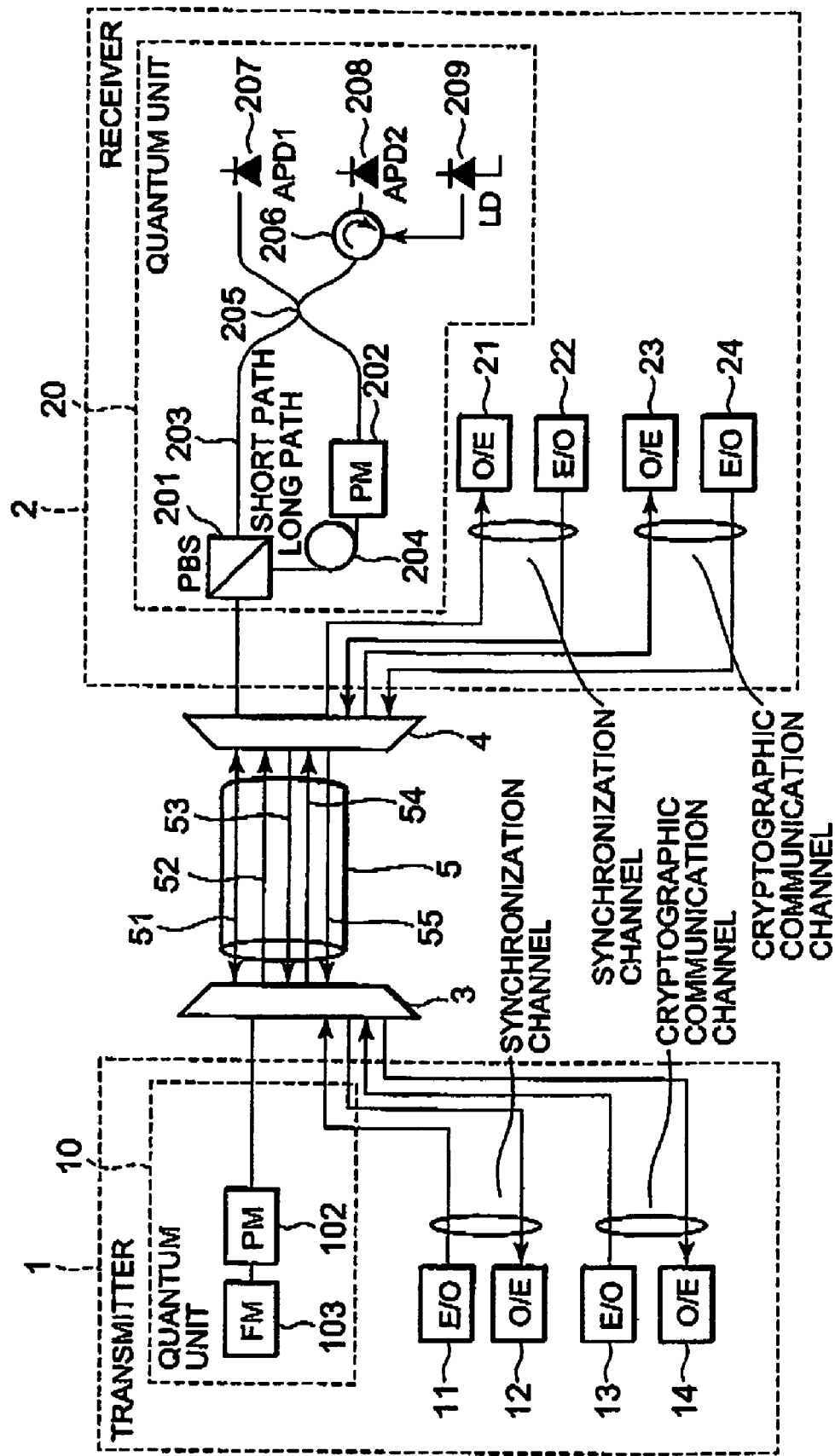

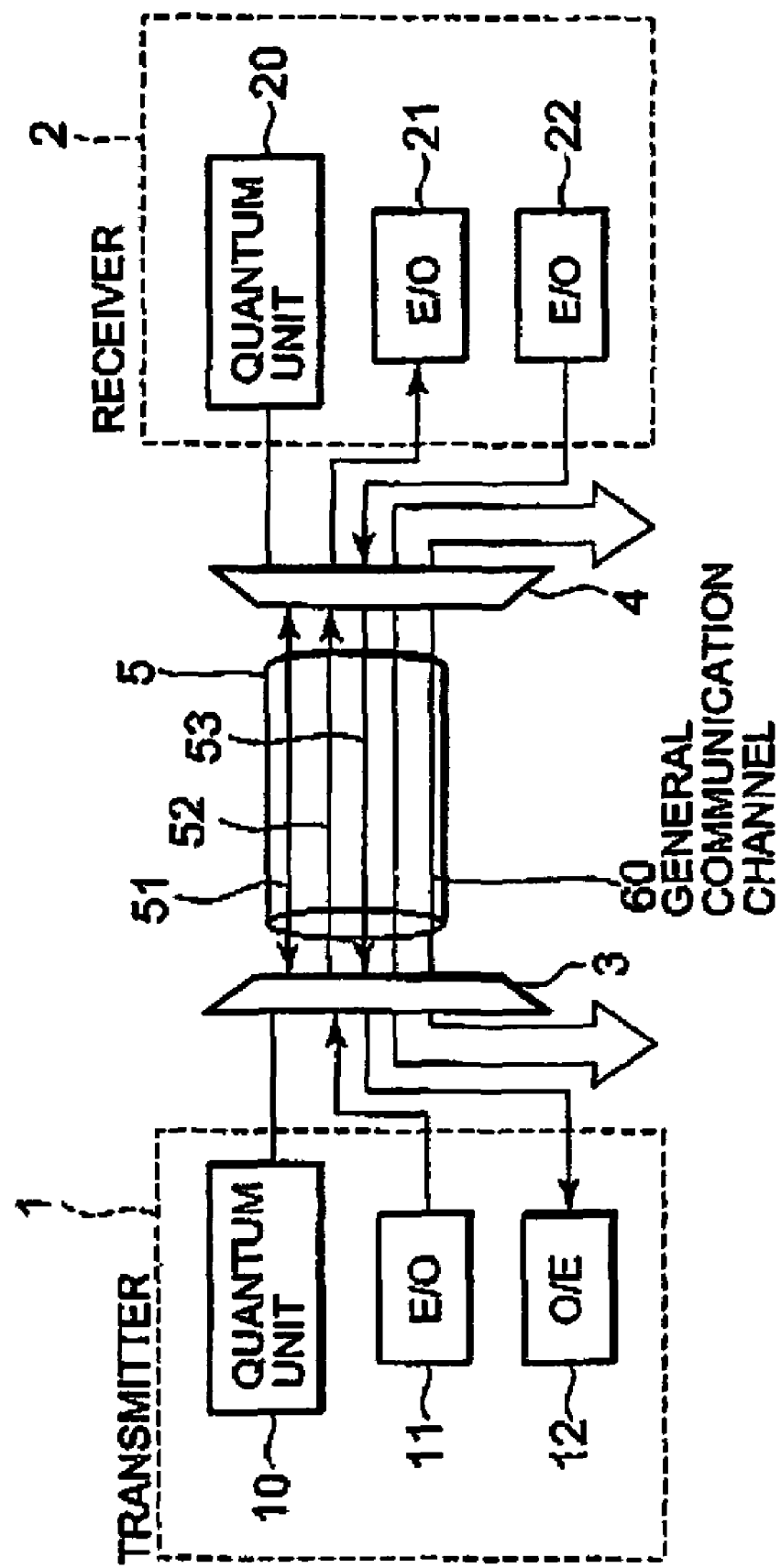

MULTIPLEXING COMMUNICATION SYSTEM AND CROSSTALK ELIMINATION METHOD

BACKGROUND OF THE INVENTION

1. Field of the Invention

The present invention relates to an optical multiplexing communication system which multiplexes a plurality of optical signals to transmit. In particular, the present invention relates to a system and method for suppressing an effect of a usually-used channel of large optical power on a channel of weak optical power. For example, the present invention is applicable to a system in which quantum communications and usually-used optical communications are performed, and is particularly applicable to a system which multiplexes a quantum channel and a classical channel that are used for a quantum key distribution system.

2. Description of the Related Art

In the field of quantum cryptography, it is known based on Heisenberg's uncertainty principle that eavesdropping between a sender and a receiver can be detected with high probability. In other words, this fact indicates that a secret bit string (cryptographic key) can be shared between the sender and receiver without being eavesdropped. As an example of a procedure to share the secret information, BB84 (Bennett Brassard 84) protocol using four quantum states is known. A high level of security can be achieved by using a bit string created through this procedure as a key of Vernam cipher, which has been proved to be absolutely secure.

There have been proposed some quantum key distribution systems employing such a scheme. In particular, "Plug & Play" schemes proposed by the groups at the University of Geneva, Switzerland, are supposed to be promising schemes to bring a quantum key distribution system, which is sensitive to polarization, into practical use because the "Plug & Play" schemes can compensate for fluctuations in polarization occurring over an optical fiber transmission line. (See the followings:

G. Ribordy, J. D. Gautier, N. Gisin, O. Guinnard, and H. Zbinden "Automated 'plug & play' quantum key distribution" ELECTRONICS LETTERS, Vol. 34, No. 22 (Oct. 29, 1998), pp. 2116 to 2117;

A. Muller, T. Herzog, B. Huttner, W. Tittel, H. Zbinden, and N. Gisin "'Plug & Play' systems for quantum cryptography" Applied Physics Letters, Vol. 70, No. 7 (Feb. 17, 1997), pp. 793 to 795; and H. Zbinden, J. D. Gautier, N. Gisin, B. Huttner, A. Muller, and W. Tittel "Interferometry with Faraday mirrors for quantum cryptography" ELECTRONICS LETTERS, Vol. 33, No. 7 (Mar. 27, 1997), pp. 586 to 588.)

A general configuration of a "Plug & Play" system is shown in FIG. 1.

In this plug & play system, optical pulse P is first generated by a laser LD in a device on the quantum key-receiving side (traditionally referred to as "Bob") and then split into two pulses. One of the pulses, optical pulse P1, goes along a short path, and the other, optical pulse P2, goes along a long path, whereby the two pulses are sent to a sending-side device (traditionally referred to as "Alice") with a small time delay between them. Upon receiving the optical pulses P1 and P2 sequentially, Alice allows the optical pulse P1 to be reflected by Faraday mirrors to make its polarization state rotate by 90 degrees and sends the optical pulse P1 back to Bob. Moreover, Alice similarly allows the optical pulse P2 to be reflected by the Faraday mirrors while modulating the phase of the optical pulse P2. Then, Alice sends phase-modulated optical pulse $P2^{*a}$ back to Bob. At Bob, the optical pulse P1 received from Alice passes along the long path, which is a different path from the path used when the optical pulse P1 was sent out. At the same time, Bob modulates the phase of the optical pulse P1 to obtain phase-modulated optical pulse $P1^{*b}$. Meanwhile, the optical pulse $P2^{*a}$, which has been phase-modulated on Alice's side, passes through the short path, which is a different path from the path used when it (i.e., the optical pulse P2) was sent out. Thereafter, the optical pulse $P2^{*a}$ interferes with the optical pulse $P1^{*b}$ phase-modulated on Bob's side. The result of the interference is detected by any one of photo detectors APD1 and APD2 (APD: Avalanche PhotoDiode). As a whole, the optical pulses P1 and P2, obtained by splitting the optical pulse P into two, follow the same optical path and then interfere with each other. Accordingly, since variations in delay due to the optical fiber transmission line cancel out, the result of the interference observed by the photo detector depends on a difference between the phase modulation on Alice's side and the phase modulation on Bob's side.

The "Plug & Play" system having such a configuration requires synchronization as described below:

1) On Alice's side, to modulate the optical pulse P2 received from Bob, the modulation operation should be made to follow the variations in delay due to the optical fiber transmission line;

2) On Bob's side, to modulate the optical pulse P1 reflected from Alice, the modulation operation should be made to follow the variations in delay due to the optical fiber transmission line; and 3) On Bob's side, when an optical pulse is received from Alice, a bias should be applied to the photo detectors in accordance with reception timing of the optical pulse (ultra-high-sensitivity reception in Geiger mode).

Moreover, as is well known, in the quantum key distribution systems, it is also required to establish sharing or synchronization in unit of bits for key data sharing as in the BB84 protocol.

In the quantum key distribution systems, however, unlike classical optical communications, its optical power is very small, at a single-photon level at most. Therefore, it is impossible to perform clock extraction from a quantum channel, as conventionally performed by using a classical channel. Here, the quantum channel is a communication channel in a state where the optical power of transmission from a sender to a receiver is very weak, at most one photon per bit, whereas the classical channel is a communication channel in the range of usually-used optical power or a multi-photon communication channel.

Specifically, when communication is performed using the quantum channel with light at a very low optical power level, the quantum efficiency of the APD (photo detector) is small. Therefore, for example, even if a sender sends data with a mark ratio of ½, the mark ratio becomes far smaller than ½ at a receiver. Consequently, data losses occur, and an accurate-period clock signal cannot be extracted. The classical channel is therefore generally used to provide synchronization for such a quantum channel.

For example, Japanese Patent Application Unexamined Publication No. H08-505019 proposes a method using a classical channel to provide bit synchronization, frame synchronization and other system calibration. According to this method, both a quantum channel and a classical channel are set on the same transmission line, and the classical channel is used to perform clock synchronization for the quantum channel where the optical power is very weak.

As another example of the quantum and classical channels being set on the same transmission line, Japanese Patent Application Unexamined Publication No. 2003-37559 discloses a signal state control device. According to this conventional example, a quantum channel and a classical channel are multiplexed on the same transmission line. The polarization state of signal light on the quantum channel is controlled in real time by monitoring check light on the classical channel.

Furthermore, there has been also proposed a technology taking into consideration the influence between the quantum channel and classical channel multiplexed on the same transmission line. (See M. S. Goodman, P. Toliver, R. J. Runser, T. E. Chapuran, J. Jackel, R. J. Hughes, C. G. Peterson, K. McCabe, J. E. Nordholt, K. Tyagi, P. Hiskett, S. McNown, N. Nweke, J. T. Blake, L. Mercer, and H. Dardy, "Quantum Cryptography for Optical Networks: A Systems Perspective" LEOS 2003, Vol. QE-14, pp. 1040 to 1041.) Goodman et al. discloses a system in which an attenuator is arranged on Alice's side to adjust the power level of a classical wavelength multiplex (DWDM) signal when the DWDM signal in the 1500 nm band and a quantum key distribution (QKD) signal in the 1300 nm band are transmitted through a single common optical fiber, and in which the DWDM signal and QKD signal are combined by a 10/90 coupler. Further, another system is also described in which the power of noise in the 1300 nm band, which arises from the DWDM signal and affects the QKD signal, is effectively suppressed by replacing the attenuator and coupler with a band multiplexer.

However, in the configuration in which the quantum channel and classical channel are transmitted on the same transmission line by means of, for example, wavelength division multiplexing (WDM) as described in Japanese Patent Application Unexamined Publication Nos. H08-505019 and 2003-37559, crosstalk between the channels exists in practice. For example, crosstalk is caused by spontaneous emission light from a laser light source (laser diode) and by nonlinear optical effects (such as Raman scattering and parametric amplification).

In a usually-used optical communication system, since signal optical power on each channel is equal to that on another, the power of crosstalk light does not exceed the power of main signal light. In a quantum key distribution system, however, since the optical power on a quantum channel is very weak, the power of crosstalk light from an adjacent classical channel exceeds the power of a signal on the quantum channel. Accordingly, the crosstalk light becomes noise light to the quantum channel, degrading the signal-to-noise ratio of the quantum channel.

Moreover, in a usually-used optical communication system, it is not required to pay attention to crosstalk at the time of wavelength multiplexing for WDM transmission. In a quantum key distribution system, however, care needs to be taken at the time of multiplexing so that the power of crosstalk light from the classical channel does not exceed the power of a signal on the quantum channel.

For example, the Goodman et al. proposes a method of reducing the influence of crosstalk by employing a widened channel spacing between the quantum and classical channels in the 1300 nm and 1500 nm bands, as well as a method of suppressing the power of noise due to the spontaneous emission light from the classical channel toward the quantum channel by disposing the attenuator and 10/90 coupler, or the band multiplexer, on Alice's side.

However, according to these conventional methods, EDFA (Erbium-Doped Fiber Amplifier) is provided to the classical channel on Alice's side. Therefore, spontaneous emission light arises not only from each laser for DWDM but also from the EDFA. Accordingly, crosstalk cannot be effectively eliminated unless a wide spacing is made between the quantum channel and classical channel.

Moreover, according to the Goodman et al., filtering is merely performed on Bob's side, and no consideration is given to the influence due to the nonlinear optical effects occurring when an optical signal is propagating along the transmission line. Accordingly, this conventional configuration cannot avoid the influence due to the nonlinear optical effects.

Furthermore, according to Goodman et al., the 1300 nm band is used for the QKD signal. Therefore, transmission loss is large, limiting the transmission distance. In addition, the 1300 nm or 1500 nm band is exclusively used by the quantum channel, resulting in inefficient use of frequencies and wavelength resources.

SUMMARY OF THE INVENTION

Accordingly, an object of the present invention is to provide an optical multiplexing communication system and a crosstalk elimination method that can effectively eliminate crosstalk occurring when a communication channel of weak optical power and a usually-used communication channel of large optical power are multiplexed on an optical transmission medium, and that enables efficient information communications.

The present inventors have found that crosstalk light from the usually-used communication channel, that is, crosstalk light due to the spontaneous emission light and crosstalk light due to the nonlinear optical effects can be suppressed by adjusting the optical power on the usually-used communication channel, the transmission characteristic for the usually-used communication channel at the transmitting side, and the transmission characteristic for the weak-power communication channel at the receiving side.

According to the present invention, an optical multiplexing communication system for transmitting information by multiplexing a plurality of communication channels on an optical transmission medium, wherein the plurality of communication channels include a first channel of a relatively small optical power state and a second channel of a relatively large optical power state, includes: a multiplexer for multiplexing the plurality of channels on the optical transmission medium; and a demultiplexer for demultiplexing multiplexed communication channels that have traveled through the optical transmission medium, to separate out at least the first channel from the multiplexed communication channels, wherein a second-channel transmission characteristic of the multiplexer for the second channel, a first-channel transmission characteristic of the demultiplexer for the first channel, and an optical power of the second channel are set so that the second channel does not affect the first channel.

The second-channel transmission characteristic of the multiplexer may be set so as to suppress noise components of an optical signal on the second channel inputted to the multiplexer. The first-channel transmission characteristic of the demultiplexer may be set so as to suppress noise components of an optical signal on the second channel generated due to propagation of the optical signal on the second channel through the optical transmission medium. The optical power of the second channel may be set to a predetermined value or more in such a range that noise components of the first channel are reduced within a predetermined permissible range. More preferably, the optical power of the second channel is set to the maximum value in such a range that noise components of the first channel are minimized.

Preferably, the second-channel transmission characteristic of the multiplexer comprises a first isolation from the first channel. The first isolation is set such that crosstalk light due to spontaneous emission light of a light source for the second channel is suppressed to become smaller than optical power of signal light on the first channel. Preferably, the first-channel transmission characteristic of the demultiplexer comprises a second isolation from the second channel and a transmission bandwidth for the first channel. The second isolation is set such that crosstalk light due to nonlinear optical effects caused by propagation through the optical transmission medium is suppressed to become smaller than optical power of signal light on the first channel and the transmission bandwidth is set to a bandwidth not greater than a predetermined value within such a range that optical power of the crosstalk light due to nonlinear optical effects does not affect a spectrum of the first channel. More preferably, the transmission bandwidth is set to the narrowest bandwidth in such a range that optical power of the crosstalk light due to nonlinear optical effects does not affect a spectrum of the first channel.

The demultiplexer may comprises: a first separator for separating out a first optical signal on at least the first channel from the multiplexed communication channels according to a first transmission characteristic; and a second separator for separating out a second optical signal on the first channel from the first optical signal according to a second transmission characteristic, wherein the first transmission characteristic provides the second isolation from the second channel and the second transmission characteristic provides the transmission bandwidth.

According to another aspect of the present invention, an optical multiplexing communication system for transmitting information by multiplexing a plurality of communication channels on an optical transmission medium, wherein the plurality of communication channels include a first channel of a relatively small optical power state and a second channel of a relatively large optical power state, includes: a multiplexing and demultiplexing element provided at each of both transmitting and receiving ends of the optical transmission medium with respect to an information transmission direction of the first channel, said multiplexing and demultiplexing element multiplexing the plurality of channels on the optical transmission medium and demultiplexing multiplexed communication channels that have traveled through the optical transmission medium, wherein at least one second channel transmits an optical signal in an opposite direction to the information transmission direction of the first channel, wherein a reflection attenuation characteristic for said at least one second channel in the opposite direction in the multiplexing and demultiplexing element at the receiving end, a reflection attenuation characteristic for said at least one second channel in the opposite direction in the multiplexing and demultiplexing element at the transmitting end, and an optical power of light source for said at least one second channel in the opposite direction are set so that said at least one second channel in the opposite direction does not affect the first channel.

Further, the present invention can be also applied to a time-division multiplexing system. An optical multiplexing communication system for transmitting information by time-division multiplexing a plurality of communication channels on an optical transmission medium, wherein the plurality of communication channels include a first channel of a relatively small optical power state and a second channel of a relatively large optical power state, includes: an intensity controller for sequentially setting optical power of an output signal to a selected one of a relatively small optical power of the first channel and a relatively large optical power of the second channel to output the output signal to the optical transmission medium; and a filter having a predetermined transmission characteristic for filtering an optical signal that has traveled through the optical transmission medium, wherein the predetermined transmission characteristic of the filter and the relatively large optical power of the second channel are set so that the second channel does not affect the first channel.

In summary, an optical multiplexing communication system according to the present invention includes; a multiplexer for multiplexing the plurality of communication channels on the optical transmission medium so that the second channel does not affect the first channel; and a filter for filtering light on the first channel from light that has traveled through the optical transmission medium under a predetermined transmission characteristic so that the second channel does not affect the first channel, wherein an optical power of the second channel is set to such a range that the second channel does not affect the first channel in the light that have traveled through the optical transmission medium.

An crosstalk elimination method according to the present invention includes the steps of: multiplexing the plurality of communication channels on the optical transmission medium so that the second channel does not affect the first channel; causing light on the first channel to pass through among light that has traveled through the optical transmission medium under a predetermined transmission characteristic so that the second channel does not affect the first channel; and setting an optical power of the second channel to such a range that the second channel does not affect the first channel in the light that have traveled through the optical transmission medium.

According to the present invention, even in the case where the channel of weak optical power and the usually-used channel of commonly-used power level are multiplexed on the same optical transmission line, the usually-used channel does not affect the weak-power channel. Accordingly, it is possible to reliably transmit information through the weak-power channel.

Moreover, since the usually-used channel does not affect the weak-power channel, it is not required to make a wide spacing between the usually-used channel and the weak-power channel for crosstalk prevention. Accordingly, it is possible to efficiently use frequency resources.

Furthermore, as long as the above-described conditions are satisfied, the usually-used channel can perform information communications relevant to the communications over the weak-power channel. However, the usually-used channel can also perform general optical communications irrelevant to the communications over the weak-power channel. For example, in applications to the quantum key distribution system, bit information required for generating a cryptographic key is transmitted through the quantum channel. Accordingly, the present invention enables efficient cryptographic key generation and distribution which have not been feasible so far.

BRIEF DESCRIPTION OF THE DRAWINGS

FIG. 8 is a block diagram showing a configuration of a quantum key distribution system according to a third embodiment of the present invention;

FIG. 9 is a block diagram showing a configuration of a quantum key distribution system according to a fourth embodiment of the present invention;

FIG. 10 is a block diagram showing a configuration of a quantum key distribution system according to a fifth embodiment of the present invention;

DETAILED DESCRIPTION OF THE PREFERRED EMBODIMENTS

Hereinafter, optical multiplexing communication systems according to the present invention will be described in detail, each by taking a quantum key distribution system as an example. In the following description, a communication channel of weak optical power will be referred to as a quantum channel, and a communication channel for performing optical communications with usually-used optical power will be referred to as a classical channel.

1. First Embodiment

1.1) System Configuration

Figure 1:
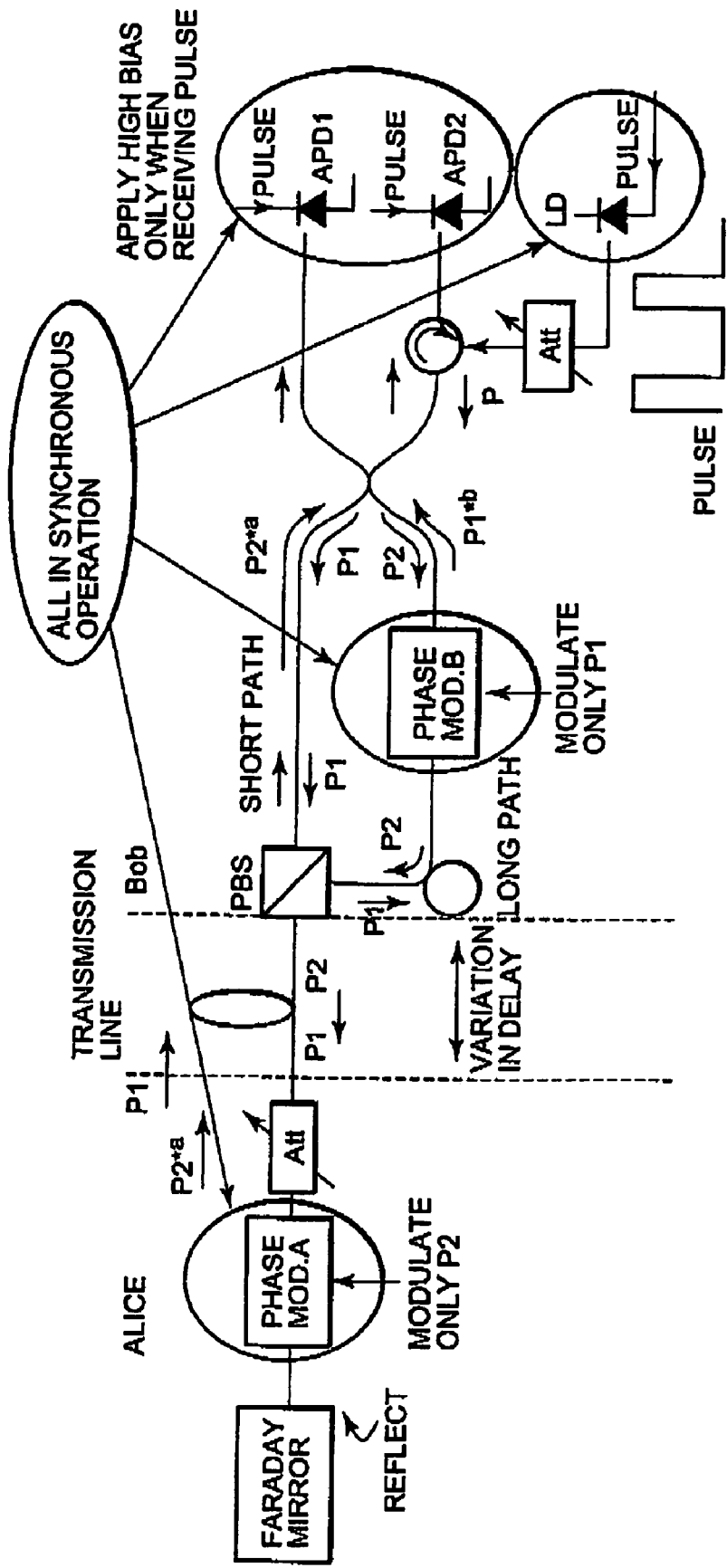
FIG. 1 is a block diagram showing a schematic configuration of a conventional quantum key distribution system.
Figure 2A:
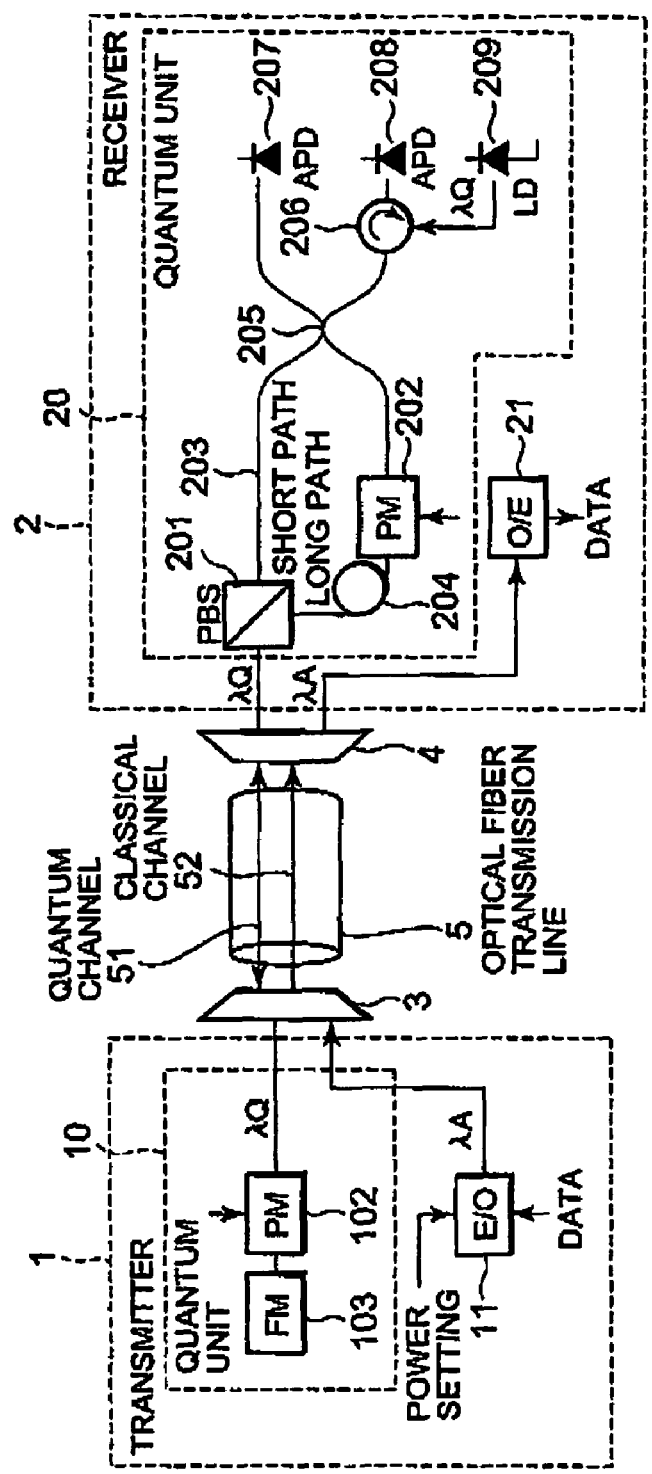
FIG. 2A is a block diagram showing a configuration of a quantum key distribution system according to a first embodiment of the present invention.
Figure 2B:
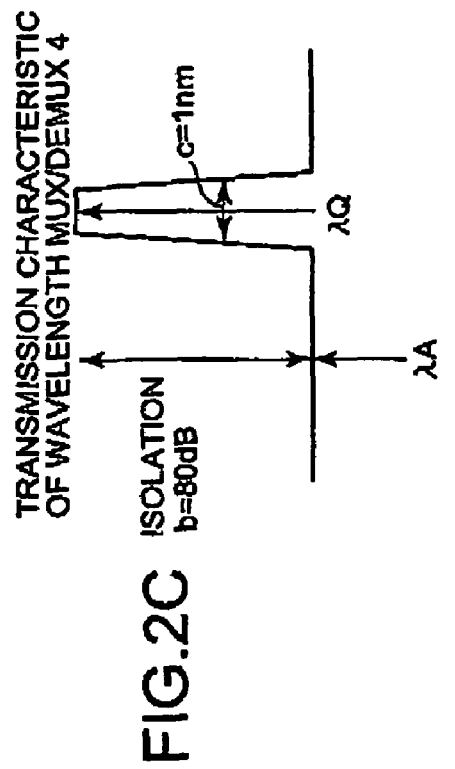
FIG. 2B is a diagram showing transmission characteristics of a transmitter-side wavelength multiplexer/demultiplexer (MUX/DEMUX) for a classical channel, in the first embodiment.
Figure 2C:
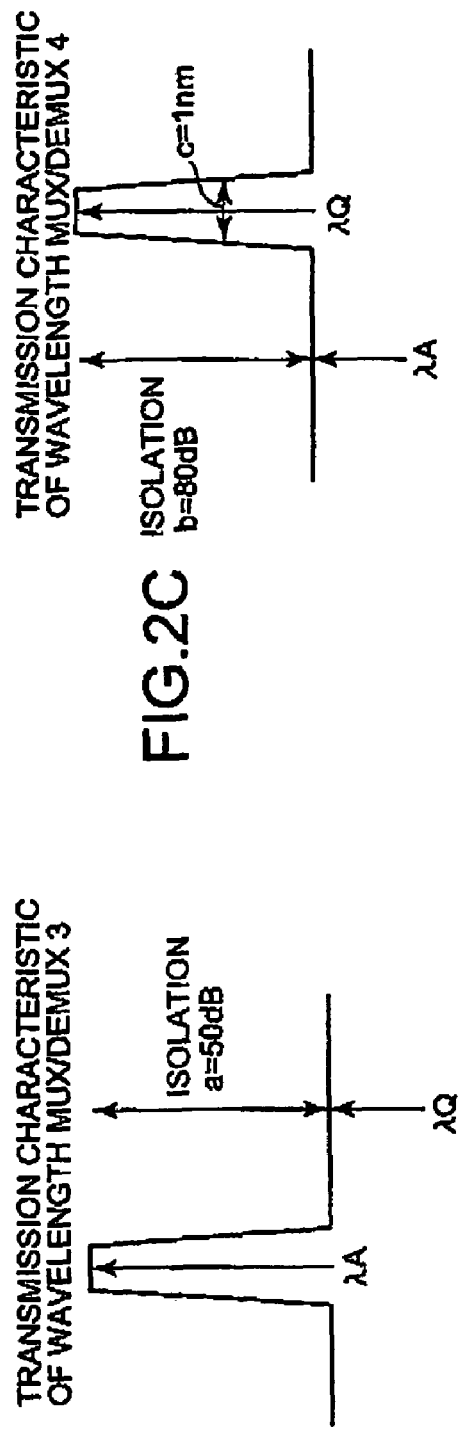
FIG. 2C is a diagram showing transmission characteristics of a receiver-side wavelength MUX/DEMUX for a quantum channel, in the first embodiment.

FIG. 2A is a block diagram showing a configuration of a quantum key distribution system according to a first embodiment of the present invention, FIG. 2B is a diagram showing the transmission characteristic of a transmitter-side wavelength multiplexer/demultiplexer (MUX/DEMUX) for a classical channel in the first embodiment, and FIG. 2C is a diagram showing the transmission characteristic of a receiver-side wavelength MUX/DEMUX for a quantum channel in the first embodiment.

Referring to FIG. 2A, the quantum key distribution system according to the first embodiment has a transmitter 1, a receiver 2, a transmitter-side wavelength MUX/DEMUX 3, and a receiver-side wavelength MUX/DEMUX 4. The transmitter-side wavelength MUX/DEMUX 3 and receiver-side wavelength MUX/DEMUX 4 are optically connected through a single optical fiber transmission line 5. The transmitter 1 has a transmitter-side quantum unit 10 and an electrical-to-optical converter (E/O) 11. The receiver 2 has a receiver-side quantum unit 20 and an optical-to-electrical converter (O/E) 21.

A quantum channel 51 and a classical channel 52 are multiplexed on the optical fiber transmission line 5. Herein, the quantum channel is a communication channel in a state where the optical power of transmission from the transmitter 1 to the receiver 2 is weak, or the number of photons per bit being equal to or smaller than one, whereas the classical channel is a communication channel in the range of optical power that is used for usually-used (conventional) optical communications. The quantum channel 51 and classical channel 52 are set at different wavelengths $\lambda Q$ and $\lambda A$, respectively, on the same transmission line (optical fiber transmission line 5), where, in this embodiment, $\lambda Q=1550$ nm and $\lambda A=1530$ nm.

The transmitter-side quantum unit 10 and receiver-side quantum unit 20 generate a cryptographic key through the quantum channel 51 on the optical fiber transmission line 5. Moreover, through the classical channel 52 on the optical fiber transmission line 5, the quantum units 10 and 20 can, for example, establish key-sharing synchronization and exchange information used for key generation according to the BB84 protocol.

The transmitter-side quantum unit 10 has a phase modulator (PM) 102 and a faraday mirror (FM) 103. The phase modulator 102 performs phase modulation according to random data bits, which are source data of a cryptographic key, and to random data bits, which are base information ("+" base or "x" base) used in modulation.

The receiver-side quantum unit 20 includes: an interferometer composed of a polarization beam splitter (PBS) 201, a phase modulator 202, a short path 203, a long path 204, and an optical coupler 205; an optical circulator 206; avalanche photodiodes (APD) 207 and 208 that are photo detectors; and a laser (LD: Laser Diode) 209 that is a pulse light source. Note that the short path 203 and long path 204 are made of polarization preserving fiber, and the optical coupler 205 and optical circulator 206 are of polarization preserving types.

The transmitter-side wavelength MUX/DEMUX 3 has the transmission characteristic for the classical channel as shown in FIG. 2B. In the first embodiment, an isolation a of the classical channel (wavelength $\lambda A$) from the quantum channel (wavelength $\lambda Q$) is designed to be 50 dB or more. As will be described later, this isolation a is set such that spontaneous emission light from the output light of the transmitter-side E/O 11 is suppressed to become sufficiently smaller than the signal light on the quantum channel.

The receiver-side wavelength MUX/DEMUX 4 has the transmission characteristic for the quantum channel as shown in FIG. 2C. In the first embodiment, an isolation b of the quantum channel from the classical channel is designed to be 80 dB or more, and a passband width c is designed to be 1 nm. The isolation b made by the wavelength MUX/DEMUX 4 is set such that the power of crosstalk light due to nonlinear optical effects, caused by an optical signal on the classical channel propagating along the optical fiber transmission line 5, is sufficiently suppressed with respect to a signal on the quantum channel. The passband width c of the wavelength MUX/DEMUX 4 is set at a predetermined width or smaller, preferably the smallest width, within a range in which the power of the crosstalk light does not affect the spectrum of the quantum channel. Here, the passband width c depends on the spectrum of the laser 209, which is the light source of a signal on the quantum channel.

Incidentally, for each of the wavelength MUX/DEMUXs 3 and 4, it is preferable to use a wavelength multiplexing and demultiplexing device employing a thin-film filter that can make a large isolation and easily set transmission characteristics and reflection attenuation characteristics.

1.2) Operation

In the first embodiment, the wavelength on the quantum channel 51, that is, the wavelength $\lambda Q$ of the output light from the laser 209 is assumed to be 1550 nm, and the wavelength on the classical channel 52, that is, the wavelength $\lambda A$ of the output laser light from the E/O 11 is assumed to be 1530 nm. The laser 209 and the laser of the E/O 11 are preferably temperature-controlled to make both the wavelengths $\lambda Q$ and $\lambda A$ stable.

Optical pulse P, an output from the laser 209, is outputted via the optical circulator 206 to the optical coupler 205, where the optical pulse P is split into two pulses. The split optical pulses P1 and P2 go along the short path 203 and the long path 204, respectively, and via the wavelength MUX/DEMUX 4, are sent to the transmitter 1 through the quantum channel 51.

At the transmitter 1, after demultiplexed by the wavelength MUX/DEMUX 3, the received optical pulses are returned by the faraday mirror 103 while their polarization states are individually rotated by 90 degrees. The returned optical pulse P1 is transmitted to the wavelength MUX/DEMUX 3 as it is, whereas the optical pulse P2 is modulated by the phase modulator 102 and then outputted as optical pulse $P2*^a$ to the wavelength MUX/DEMUX 3, which has the transmission characteristics shown in FIG. 2B. The pulses are then multiplexed with an optical signal on the classical channel. The wavelength multiplex signals thus outputted from the wavelength MUX/DEMUX 3 propagate through the optical fiber transmission line 5 and then enter the receiver-side wavelength MUX/DEMUX 4, which has the transmission characteristics shown in FIG. 2C.

The wavelength MUX/DEMUX 4 demultiplexes the wavelengths on the quantum channel and classical channel. The wavelength MUX/DEMUX 4 outputs the optical pulses P1 and $P2*^a$ on the quantum channel to the quantum unit 20 and outputs the optical signal on the classical channel to the O/E 21.

The optical pulse P1 on the quantum channel, having passed through the wavelength MUX/DEMUX 4, is outputted onto the long path 204 by the PBS 201. The optical pulse P1 is modulated by the phase modulator 202 and then outputted as optical pulse $P1*^b$ to the optical coupler 205. Meanwhile, the optical pulse $P2*^a$ on the quantum channel, having passed through the wavelength MUX/DEMUX 4, is outputted onto the short path 203 by the PBS 201 and then outputted to the optical coupler 205 as it is. Thus, the optical pulses $P1*^b$ and $P2*^a$ are allowed to interfere with each other, with a phase difference made by the transmitter-side phase modulator 102 and the receiver-side phase modulator 202. The interference result is then detected by either the photo detector APD 207 or the photo detector 208.

(A) Suppression of Crosstalk Due to Spontaneous Emission Light

Figure 3:
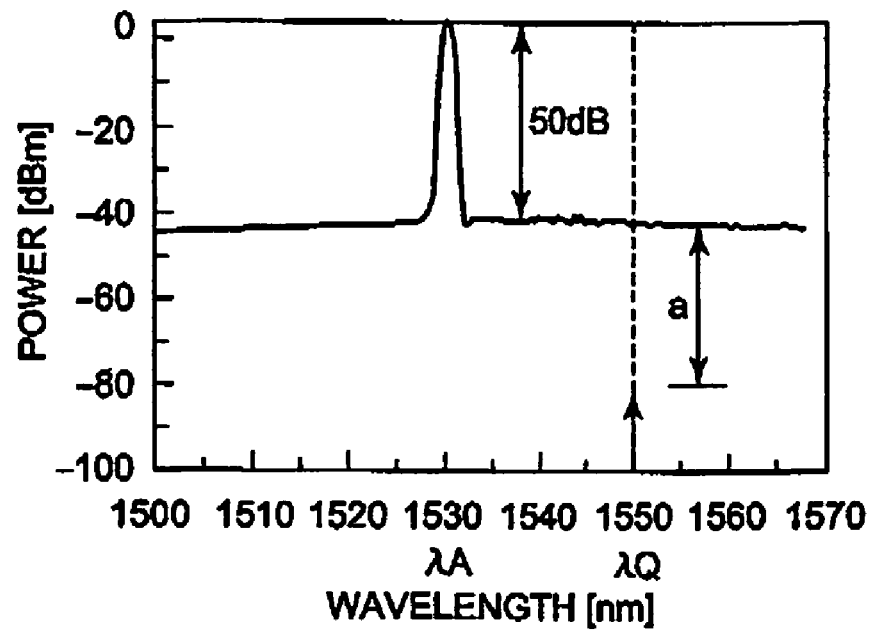
FIG. 3 is a diagram showing a power spectrum of a signal on the classical channel, to be injected into the transmitter-side wavelength MUX/DEMUX.
Figure 4:
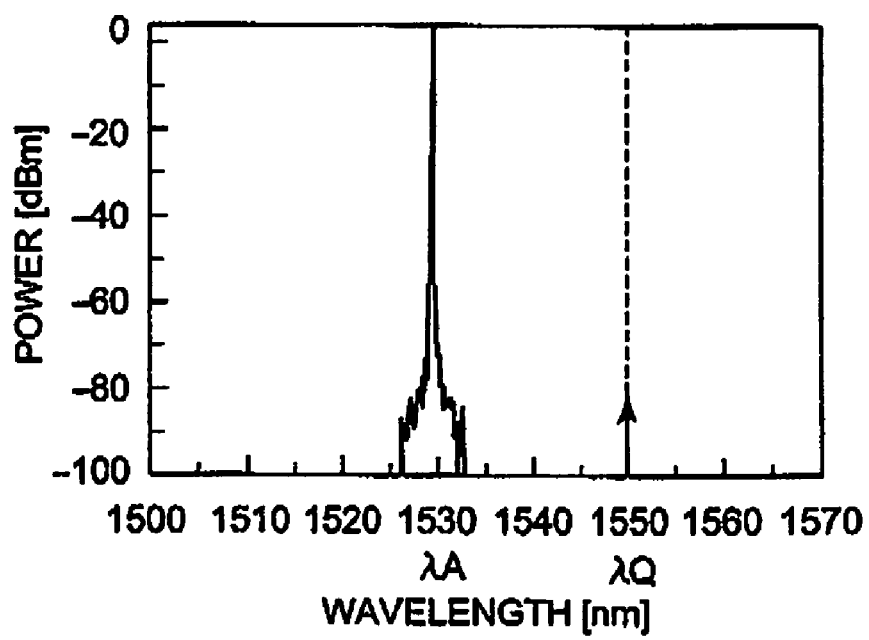
FIG. 4 is a diagram showing a power spectrum of a signal on the classical channel, ejected from the transmitter-side wavelength MUX/DEMUX.

FIG. 3 is a diagram showing a power spectrum of a signal on the classical channel to be injected into the transmitter-side wavelength MUX/DEMUX 3, and FIG. 4 is a diagram showing a power spectrum of a signal on the classical channel ejected from the transmitter-side wavelength MUX/DEMUX 3. In FIGS. 3 and 4, the horizontal axes indicate the wavelength (nm) and the vertical axes indicate the power level (dBm).

Referring to FIG. 3, in the first embodiment, the wavelength $\lambda Q$ on the quantum channel is 1550 nm, and the optical power thereon is 0.6 photon per pulse. When the transmission rate of the quantum channel is 60 MHz, the average optical power on the quantum channel is −80 dBm. On the other hand, the classical channel wavelength, that is, the wavelength $\lambda A$ of the output light from the transmitter-side E/O 11 is 1530 nm, and the difference between the optical power level in the 1530 nm band, where the power is concentrated, and the optical power level of the spontaneous emission light is 50 dBm. Accordingly, in the 1550 nm band, which is the quantum channel wavelength region, the power of the spontaneous emission light from the output laser light of the transmitter-side E/O 11, that is, the power of crosstalk light to the quantum channel is far larger than the power of the signal light on the quantum channel.

However, according to the first embodiment, as described with reference to FIG. 2B, the transmitter-side wavelength MUX/DEMUX 3 is designed such that the isolation a of the classical channel (wavelength $\lambda A$) from the quantum channel (wavelength $\lambda Q$) is 50 dB or more. Therefore, when the output light of the transmitter-side E/O 11 is injected into the wavelength MUX/DEMUX 3, most of the spontaneous emission light from the laser light is suppressed, as shown in FIG. 4. At this time, the power level of the crosstalk light to the quantum channel (wavelength $\lambda Q$=1550 nm) becomes −100 dBm or less, which is sufficiently smaller than the power level (−80 dBm) of the signal light on the quantum channel.

In this way, by using the wavelength MUX/DEMUX 3 having the transmission characteristic for the classical channel shown in FIG. 2B, the signal light on the quantum channel, having weak power, and the signal light on the classical channel, from which the crosstalk light is suppressed so as to affect the quantum channel as little as possible, are wavelength-multiplexed as shown in FIG. 4 and outputted onto the optical fiber transmission line 5.

(B) Suppression of Crosstalk Due to Nonlinear Optical Effects

The optical fiber propagation characteristics include nonlinear optical effects. Here, the spontaneous Raman scattering and parametric amplification in the classical channel are particularly problematic. After passing through the wavelength MUX/DEMUX 3, the optical signal on the classical channel 52 has the spectrum as shown in FIG. 4. However, as the optical signal propagates down the optical fiber transmission line 5, crosstalk light arises due to the nonlinear optical effects.

Figure 5:
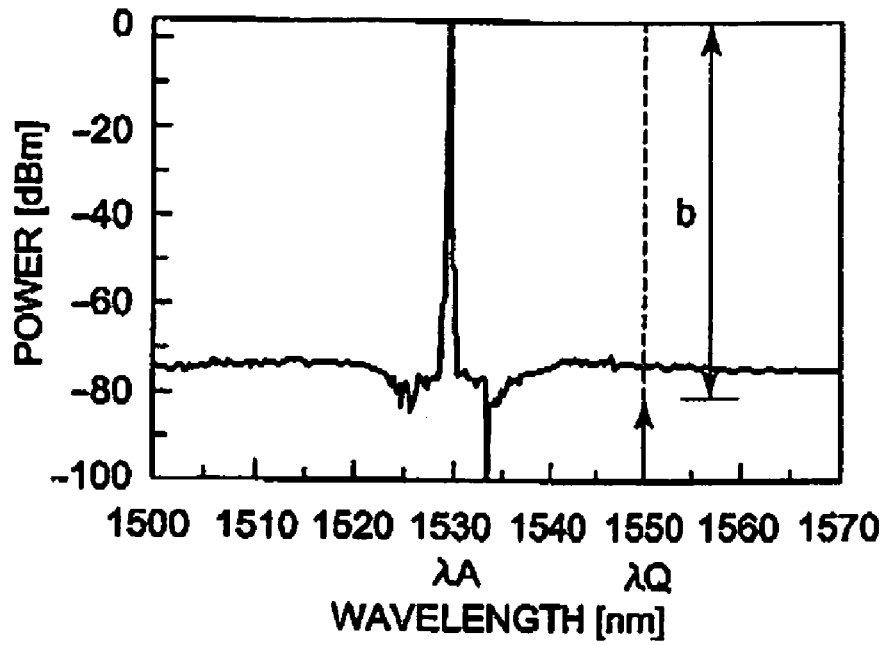
FIG. 5 is a diagram showing a power spectrum of a signal on the classical channel after the signal has propagated down an optical fiber with a transmission length of 20 km.

FIG. 5 is a diagram showing a power spectrum of a signal on the classical channel after the signal has propagated along the optical fiber with a transmission line length of 20 km. As shown in FIG. 5, in the 1550 nm band, which is the quantum channel wavelength region, the power level of crosstalk light due to the nonlinear optical effects is above −80 dBm, and the crosstalk light may affect the signal on the quantum channel.

However, according to the first embodiment, as described with reference to FIG. 2C, the receiver-side wavelength MUX/DEMUX 4 is designed: such that the isolation b of the quantum channel from the classical channel is 80 dB or more, and that the passband width c is 1 nm. Accordingly, when the wavelength multiplex signals on the classical channel and quantum channel are injected into the wavelength MUX/DEMUX 4, the classical channel component having larger power than the quantum channel component is suppressed by the isolation b. In addition, the passband width c can prevent the classical channel component that exceeds this bandwidth from entering the receiver-side quantum unit 20 as noise.

Here, if the passband width included in the transmission characteristics of the wavelength MUX/DEMUX 4 is sufficiently wider than the spectrum of the quantum channel, then the crosstalk light due to the nonlinear optical effects as shown in FIG. 5 is detected as noise by the APD 207 or 208. Therefore, as the passband width becomes wider, the signal-to-noise ratio (SNR) of the quantum channel is degraded. For this reason, it is preferable that the passband width of the wavelength MUX/DEMUX 4 be set at a predetermined width or smaller, preferably the smallest width, within a range in which the spectrum of the quantum channel is not affected. In this embodiment, the passband width of the wavelength MUX/DEMUX 4 is set at 1 nm, which is determined depending on the spectrum of the laser 209, which is the light source for the quantum channel.

(C) Power Control on Classical Channel

Further, to satisfactorily suppress the crosstalk light due to the spontaneous emission light and the crosstalk light due to the nonlinear optical effects described above, it is also required to control power to input to the classical channel, that is, the output laser power of the transmitter-side E/O 11.

As the power on the classical channel is increased, although the transmission distance extends, the power level of crosstalk light shown in FIG. 3 also rises. This leads to an inability to sufficiently suppress the crosstalk light due to the spontaneous emission light even after the signal on the classical channel has passed through the wavelength MUX/DEMUX 3, because the isolation a made by the wavelength MUX/DEMUX 3 is fixed. Accordingly, the power level of crosstalk light shown in FIG. 4 also becomes higher, which affects the quantum channel. Additionally, the power level of crosstalk light due to the nonlinear optical effects, occurring during the signal propagation through the optical fiber transmission line 5, also increases proportionately with the power on the classical channel.

Figure 6:
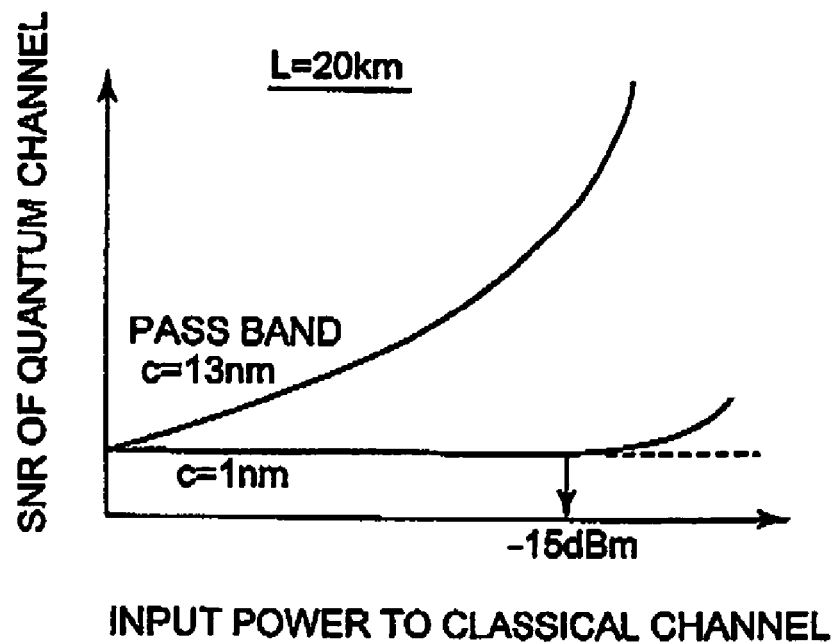
FIG. 6 is a graph showing the SNR (signal-to-noise ratio) of the quantum channel varying with the power on the classical channel inputted into the transmitter-side wavelength MUX/DEMUX.

FIG. 6 is a graph showing the SNR of the quantum channel varying with the power on the classical channel to be inputted to the transmitter-side wavelength MUX/DEMUX 3. In this example, the SNR of the quantum channel was measured when a signal was transmitted through the optical fiber transmission line 5 with a length of 20 km, using the wavelength MUX/DEMUXs 3 and 4 having the transmission characteristics shown in FIGS. 2B and 2C, respectively.

As is apparent from FIG. 6, in the case where the transmission distance L=20 km, the input power to the classical channel to achieve the longest transmission distance without affecting the quantum channel, that is, the maximum input power to the classical channel that does not increase the SNR of the quantum channel is −15 dBm. This maximum input power to the classical channel varies with the transmission distance L. In the case of L=20 km, it is necessary to set the input power to the classical channel at −15 dBm or less. Since there are losses of the optical fiber transmission line 5 and the wavelength MUX/DEMUXs 3 and 4, the input power to the O/E 21 becomes −30 dBm or less. Accordingly, the O/E 21 is preferably a high-sensitive photo detector. Note that for comparison, FIG. 6 also shows the relationship between the SNR of the quantum channel and the input power to the classical channel when the passband width of the wavelength MUX/DEMUX 4 for the quantum channel is 13 nm. From this measurement result, it is understood that when the passband width is unnecessarily wide, the SNR of the quantum channel is degraded regardless of the input power to the classical channel and therefore communications over the quantum channel cannot be properly performed.

1.3) Advantages

As described hereinabove, according to the first embodiment, the optical power on the classical channel is controlled, and the transmission characteristics (isolation and passband width) of the wavelength MUX/DEMUXs for the classical channel and quantum channel are designed, thereby suppressing the crosstalk light from the classical channel. Thus, it is possible to implement a quantum key distribution system in which the classical channel does not affect the quantum channel.

In addition, since the crosstalk light from the classical channel can be suppressed, no wide spacing is needed between the classical channel and quantum channel, enabling efficient use of frequency resources. In this embodiment, crosstalk was able to be eliminated when $\lambda Q=1550$ nm and $\lambda A$ 1530 nm.

2. Second Embodiment 2.1) System Configuration

Figure 7A:
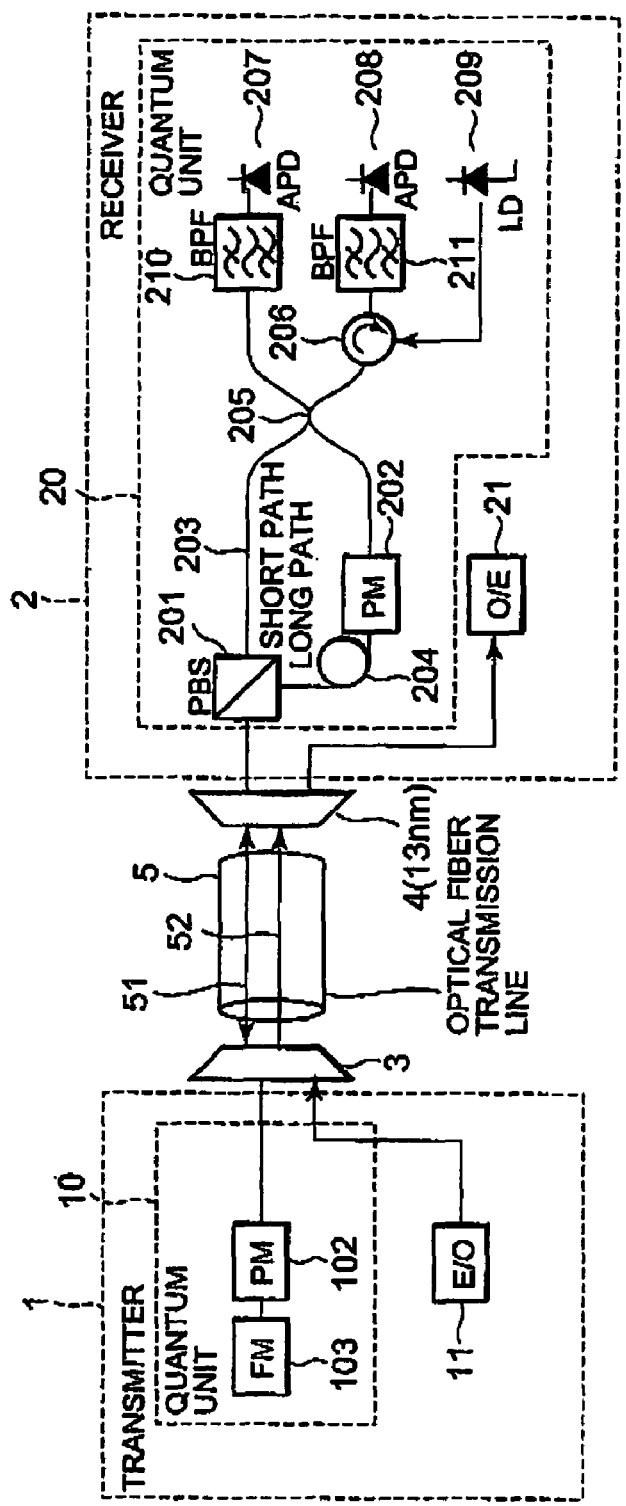
FIG. 7A is a block diagram showing a configuration of a quantum key distribution system according to a second embodiment of the present invention.
Figure 7B:
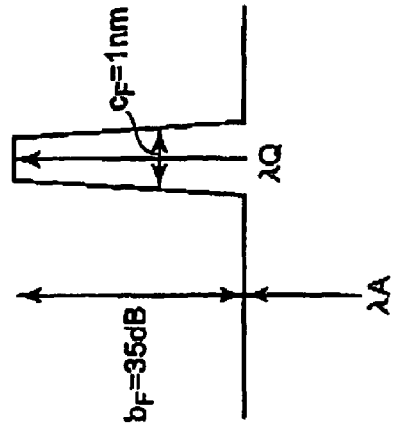
FIG. 7B is a diagram showing transmission characteristics of a receiver-side wavelength MUX/DEMUX for a quantum channel, in the second embodiment.
Figure 7C:
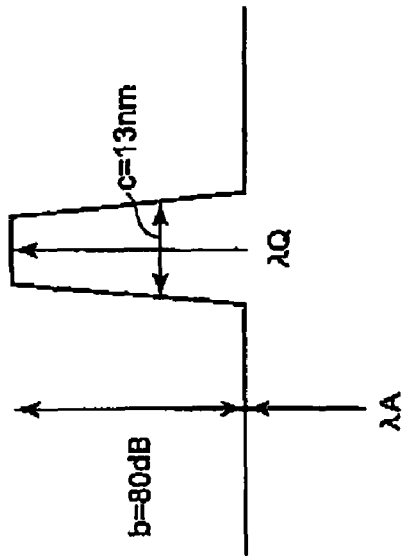
FIG. 7C is a diagram showing transmission characteristics of a band-pass filter (PBF) placed before a receiver-side photo detector, in the second embodiment.

FIG. 7A is a block diagram showing a configuration of a quantum key distribution system according to a second embodiment of the present invention, FIG. 7B is a diagram showing the transmission characteristic of a receiver-side wavelength MUX/DEMUX for a quantum channel in the second embodiment, and FIG. 7C is a diagram showing the transmission characteristic of a band-pass filter (BPF) placed before a receiver-side photo detectors in the second embodiment. Note that in FIG. 7A, the quantum key distribution system according to the second embodiment has substantially the same configuration as the system according to the first embodiment shown in FIG. 2A, except that the system according to the second embodiment adds BPFs 210 and 211. Therefore, the same reference numerals as those used in the first embodiment will be used in the second embodiment, and detailed description will be omitted.

Similarly to the first embodiment, the transmitter-side wavelength MUX/DEMUX 3 has the transmission characteristic for the classical channel shown in FIG. 2B.

On the other hand, the receiver-side wavelength MUX/DEMUX 4 has the transmission characteristic for the quantum channel shown in FIG. 7B. In the second embodiment, the isolation b of the quantum channel from the classical channel is designed to be 80 dB or more, and the passband width c is designed to be 13 nm. This value of the passband width c (=13 nm) is a value used by a generally used wideband filter and is designed to be sufficiently wider than the spectrum of the quantum channel. The isolation b made by the wavelength MUX/DEMUX 4 is set so as to suppress the classical channel component, as in the first embodiment.

The BPFs 210 and 211 are placed on the light-receiving sides of the APDs 207 and 208, respectively. After interfering at the interferometer, the interference result passes through the BPFs 210 and 211 and is detected by the APDs 207 and 208. Each of the BPFs 210 and 211 has the transmission characteristic shown in FIG. 7C and is designed such that an isolation $b_F$ of the quantum channel from the classical channel is 35 dB or more and that a passband width $c_F$ is 1 nm. The passband width $C_F$ is set at a predetermined width or smaller, preferably the smallest width, within a range in which the spectrum of the quantum channel is not affected. Here, the passband width $c_F$ depends on the spectrum of the laser 209, which is the light source of a signal on the quantum channel.

2.2) Operation

Wavelength multiplex signals outputted from the wavelength MUX/DEMUX 3 propagate through the optical fiber transmission line 5 and then enter the receiver-side wavelength MUX/DEMUX 4, which has the transmission characteristic shown in FIG. 7B.

The wavelength MUX/DEMUX 4 demultiplexes the wavelengths on the quantum channel and classical channel and outputs the optical pulses P1 and $P2^{*a}$ on the quantum channel to the quantum unit 20, and the optical signal on the classical channel to the O/E 21.

The optical pulse P1 on the quantum channel, having passed through the wavelength MUX/DEMUX 4, is outputted onto the long path 204 by the PBS 201, modulated by the phase modulator 202, and outputted as the optical pulse $P1^{*b}$ to the optical coupler 205. Meanwhile, the optical pulse $P2^{*a}$ on the quantum channel, having passed through the wavelength MUX/DEMUX 4, is outputted onto the short path 203 by the PBS 201 and then outputted to the optical coupler 205 as it is. Thus, the optical pulses $P1^{*b}$ and $P2^{*a}$ are allowed to interfere with each other, with a phase difference made by the transmitter-side phase modulator 102 and the receiver-side phase modulator 202. Then, after passing through the BPFs 210 and 211, the interference result is detected by either the photo detector APD 207 or the photo detector APD 208.

As described above, according to the second embodiment, the receiver-side wavelength MUX/DEMUX 4 is designed such that the isolation b of the quantum channel from the classical channel is 80 dB or more, and that the passband width c is 13 nm. Accordingly, when the wavelength multiplex signals on the classical channel and quantum channel enter the wavelength MUX/DEMUX 4, the classical channel component having larger power than the quantum channel component is suppressed by the isolation b. Moreover, the passband width c can prevent the classical channel component that exceeds this bandwidth from entering the receiver-side quantum unit 20 as noise.

Here, if the passband width c of the wavelength MUX/DEMUX 4 for the quantum channel is narrower than the spectrum of the quantum channel, spectral components in the quantum channel are changed, leading to incomplete interference. Therefore, it is preferable that the passband width c of the wavelength MUX/DEMUX 4 for the quantum channel be made sufficiently wider than the spectrum of the quantum channel, whereby the optical signals on the quantum channel are allowed to completely interfere at the interferometer and then detected by the APD 207 or 208.

Conversely, if the passband width c of the wavelength MUX/DEMUX 4 for the quantum channel is excessively wide compared with the spectrum of the quantum channel, the crosstalk light due to the nonlinear optical effects as shown in FIG. 5 may arrive at the APDs 207 and 208 as noise. Accordingly, as the passband width c of the wavelength MUX/DEMUX 4 becomes wider, the SNR of the quantum channel is degraded.

Therefore, the BPFs 210 and 211 are placed between the optical coupler 205 and the APDs 207 and 208, respectively, and noise is sufficiently eliminated by the passband width $c_F$ (=1 nm) of each of the BPFs 210 and 211. Thus, a quantum signal having a good SNR can be detected by the APD 207 or 208.

Note that in the second embodiment, (A) suppression of crosstalk due to the spontaneous emission light and (C) power control on the classical channel, which are described in the first embodiment, are similar to those in the first embodiment, and therefore the description thereof will be omitted.

2.3) Advantages

As described hereinabove, according to the second embodiment, the optical power on the classical channel is controlled, and the transmission characteristics (isolation and passband width) of the wavelength MUX/DEMUXs for the classical channel and quantum channel are designed. In addition, the passband characteristics of the band-pass filters disposed respectively for the photo detectors are designed, thereby suppressing the crosstalk light from the classical channel. Thus, it is possible to implement a quantum key distribution system in which the classical channel does not affect the quantum channel.

According to the second embodiment in particular, the BPF is provided to the receiver-side quantum unit, thereby eliminating noise that affects the quantum channel. Thus, it is possible to use a wavelength MUX/DEMUX having general transmission characteristics as the receiver-side wavelength MUX/DEMUX 4. Accordingly, it is not required to provide a specially designed wavelength MUX/DEMUX, facilitating the installation of additional classical channels, giving great advantages in cost.

3. Third Embodiment

FIG. 8 is a block diagram showing a configuration of a quantum key distribution system according to a third embodiment of the present invention. The quantum key distribution system according to the third embodiment has substantially the same configuration and operation as the system according to the first embodiment shown in FIG. 2A, except that an O/E 12 provided to the transmitter 1 and an E/O 22 provided to the receiver 2 are connected to each other through a classical channel 53 on the optical fiber transmission line 5. Therefore, the same reference numerals as those used in the first embodiment will be used in the third embodiment, and detailed description will be omitted.

An optical signal on the classical channel 53 is transmitted in the opposite direction to a quantum-state transmission direction of the quantum channel 51. At the transmitter-side wavelength MUX/DEMUX 3, wavelength multiplexing is performed for the quantum channel 51 and wavelength demultiplexing is performed for the classical channel 53. At the receiver-side wavelength MUX/DEMUX 4, wavelength demultiplexing is performed for the quantum channel 51 and wavelength multiplexing is performed for the classical channel 53. Therefore, it is needed to prevent the output light of the receiver-side E/O 22 to be multiplexed by the wavelength MUX/DEMUX 4 from affecting the quantum channel 51 to be detected by the APDs 207 and 208.

In the third embodiment, the wavelength MUX/DEMUX 4 is designed such that the amount of reflection attenuation for the classical channel 53 is 50 dB or more. Additionally, as an optical fiber transmission characteristic, backscattered light due to the Rayleigh scattering may conceivably exist in the optical fiber. However, this will not be a problem because an influence of the Rayleigh scattering on the quantum channel can be suppressed as long as the wavelength MUX/DEMUX 4 satisfies the transmission characteristic for the quantum channel shown in FIG. 2C.

Moreover, as for the light of the classical channel 53 to be wavelength-demultiplexed by the wavelength MUX/DEMUX 3, this will not be a problem either, as long as the amount of reflection attenuation made by the wavelength MUX/DEMUX 3 for the classical channel 53 is set at 50 dB or more and the wavelength MUX/DEMUX 4 satisfies the transmission characteristic for the quantum channel shown in FIG. 2C.

Note that in the third embodiment, as in the first embodiment, the output power of the E/O 11, which is the light source for the classical channel 52, and the output power of the E/O 22, which is the light source for the classical channel 53, should be at such a level that the light of each channel does not affect the quantum channel by using the transmission characteristics of the wavelength MUX/DEMUXs 3 and 4 and achieves propagation over a necessary transmission distance (see FIG. 6).

As described hereinabove, according to the third embodiment, the optical power on each classical channel is controlled, and the transmission characteristics (isolation and passband width) of the wavelength MUX/DEMUXs for the quantum channel and the classical channel are designed. In addition, the amount of reflection attenuation for the classical channel in the opposite transmission direction is designed as described above, thereby suppressing the crosstalk light from a plurality of classical channels in different transmission directions. Thus, it is possible to implement a quantum key distribution system in which the classical channels do not affect the quantum channel.

Additionally, by applying the above-described second embodiment to the quantum unit 20 of the third embodiment, a wavelength MUX/DEMUX having general transmission characteristics can be used as the receiver-side wavelength MUX/DEMUX 4. Accordingly, it is possible, only by taking into account the amount of reflection attenuation, to facilitate the installation of additional classical channels, giving great advantages in cost.

4. Fourth Embodiment

FIG. 9 is a block diagram showing a configuration of a quantum key distribution system according to a fourth embodiment of the present invention. In the quantum key distribution system according to the fourth embodiment, an E/O 13 and an O/E 14 are added to the transmitter 1, and an O/E 23 and an E/O 24 are added to the receiver 2. Moreover, the E/O 13 of the transmitter 1 and the O/E 23 of the receiver 2 are optically connected to each other through a classical channel 54, and the E/O 24 of the receiver 2 and the O/E 14 of the transmitter 1 are optically connected to each other through a classical channel 55. Except for these points, the quantum key distribution system according to the fourth embodiment has substantially the same configuration and operation as the system according to the third embodiment shown in FIG. 8. Therefore, the same reference numerals as those used in the third embodiment will be used in the fourth embodiment, and detailed description will be omitted.

In the fourth embodiment, the bi-directional classical channels 52 and 53 are used as synchronization channels for performing clock synchronization in place of the quantum channel of weak power. Moreover, the bi-directional classical channels 54 and 55 are used as cryptographic communication channels for performing cryptographic communication using a cryptographic key that has been distributed through the quantum key distribution system.

Since an optical signal on the classical channel 54 is transmitted in the same direction as the quantum-state transmission direction of the quantum channel 51, the transmission characteristic of the wavelength MUX/DEMUX 3 for the classical channel 54 needs to be similar to the transmission characteristic for the classical channel 52 shown in FIG. 2B. Moreover, the transmission characteristic of the wavelength MUX/DEMUX 4 for the quantum channel 51 with respect to the classical channel 54 needs to be similar to the transmission characteristic for the quantum channel 51 with respect to the classical channel 52 shown in FIG. 2C.

Further, since an optical signal on the classical channel 55 is transmitted in the opposite direction to the transmission direction of the quantum channel 51, the transmission characteristic of the wavelength MUX/DEMUX 3 for the classical channel 55 requires an amount of reflection attenuation similar to the amount of reflection attenuation for the classical channel 53 as described in the third embodiment. The transmission characteristic of the wavelength MUX/DEMUX 4 for the classical channel 55 also requires an amount of reflection attenuation similar to the amount reflection attenuation for the classical channel 53 as described in the third embodiment.

As described hereinabove, according to the fourth embodiment, as in the third embodiment, the optical power on each classical channel is controlled, and the transmission characteristics of the wavelength MUX/DEMUXs for the classical channels and quantum channel are designed, thereby suppressing the crosstalk light from the classical channels. Thus, it is possible to implement a quantum key distribution system in which the classical channels do not affect the quantum channel.

Additionally, by applying the above-described second embodiment to the quantum unit 20 of the fourth embodiment, a wavelength MUX/DEMUX having general transmission characteristics can be used as the receiver-side wavelength MUX/DEMUX 4. Accordingly, it is possible, only by taking the amount of reflection attenuation into consideration, to facilitate the installation of additional classical channels, giving great advantages in cost.

5. Fifth Embodiment

FIG. 10 is a block diagram showing a configuration of a quantum key distribution system according to a fifth embodiment of the present invention. In the fifth embodiment, the classical channels 54 and 55 in the fourth embodiment shown in FIG. 9 are replaced with a channel 60 for optical signals used in general communications. Except for this point, the quantum key distribution system according to the fifth embodiment has substantially the same configuration and operation as the system according to the third embodiment shown in FIG. 8. Therefore, the same reference numerals as those used in the third embodiment will be used in the fifth embodiment, and detailed description will be omitted.

The optical signal used in general communications is a signal irrelevant to the quantum key distribution system and is transmitted in the same direction as or the opposite direction to the transmission direction of the quantum channel 51. The channel 60 for this kind of optical signals is composed of a plurality of classical channels. Laser outputs to this general communication channel 60 are controlled in a similar manner to the third embodiment.

According to the fifth embodiment, as in the third embodiment, the optical power on each classical channel is controlled, and the transmission characteristics of the wavelength MUX/DEMUXs for the classical channels and quantum channel are designed as described before, thereby suppressing the crosstalk light from the classical channels. Thus, it is possible to implement a quantum key distribution system in which the classical channels do not affect the quantum channel.

Additionally, by applying the above-described second embodiment to the quantum unit 20 of the fifth embodiment, a wavelength MUX/DEMUX having general transmission characteristics can be used as the receiver-side wavelength MUX/DEMUX 4. Accordingly, it is possible, only by taking the amount of reflection attenuation into consideration, to facilitate the installation of additional classical channels, giving great advantages in cost.

6. Sixth Embodiment

Figure 11:
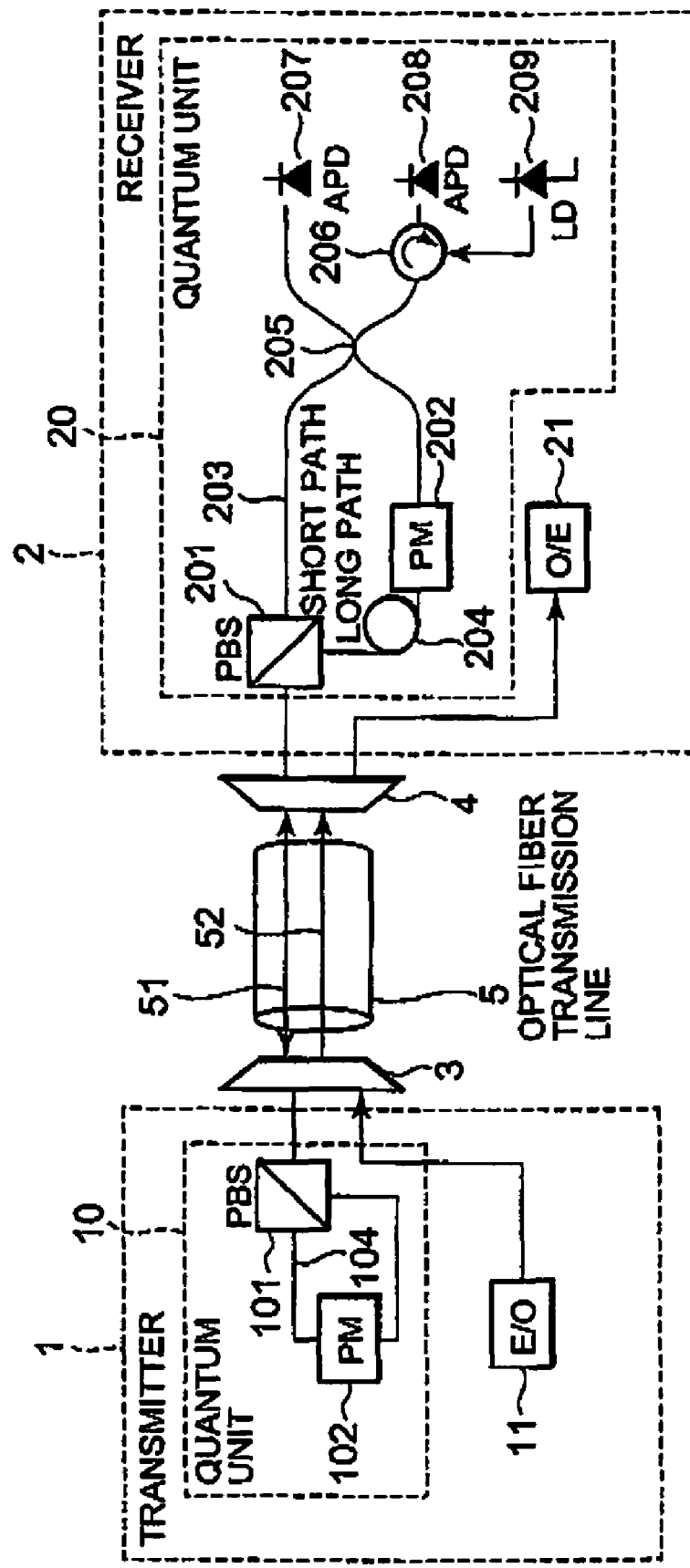
FIG. 11 is a block diagram showing a configuration of a quantum key distribution system according to a sixth embodiment of the present invention.

FIG. 11 is a block diagram showing a configuration of a quantum key distribution system according to a sixth embodiment of the present invention. The quantum key distribution system according to the sixth embodiment has substantially the same configuration as the system according to the first embodiment shown in FIG. 2A, except that a PBS loop 104 is used in place of the faraday mirror 103 in the transmitter 1 according to the first embodiment shown in FIG. 2A. Therefore, the same reference numerals as those used in the first embodiment will be used in the sixth embodiment, and detailed description will be omitted.

The PBS loop 104 allows optical pulses on the quantum channel, after demultiplexed by the wavelength MUX/DEMUX 3, to pass through a PBS 101 and the phase modulator 102 and to return to the PBS 101 again, and then sends the combined optical pulses back to the receiver 2 via the wavelength MUX/DEMUX 3.

The phase modulator 102 of the sixth embodiment provides phase modulation that is equivalent to a 90-degree polarization rotation occurring when the signal light on the quantum channel is reflected by the faraday mirror 103 in the first embodiment. The operation of the sixth embodiment thereafter is substantially the same as the first embodiment.

According to the sixth embodiment, as in the first embodiment, the optical power on the classical channel is controlled, and the transmission characteristics of the wavelength MUX/DEMUXs for the classical channel and quantum channel are designed as described before, thereby suppressing the crosstalk light from the classical channel. Thus, it is possible to implement a quantum key distribution system in which the classical channel does not affect the quantum channel.

Additionally, by applying the above-described second embodiment to the quantum unit 20 of the sixth embodiment, a wavelength MUX/DEMUX having general transmission characteristics can be used as the receiver-side wavelength MUX/DEMUX 4. Accordingly, it is possible, only by taking the amount of reflection attenuation into consideration, to facilitate the installation of additional classical channels, giving great advantages in cost.

Furthermore, the transmission direction of the classical channel of the sixth embodiment may be the same as or the opposite to a transmission direction of the quantum channel 51, as in the above-described third to fifth embodiments. The classical channel may be a plurality of channels.

7. Seventh Embodiment

7.1) System Configuration

Figure 12A:
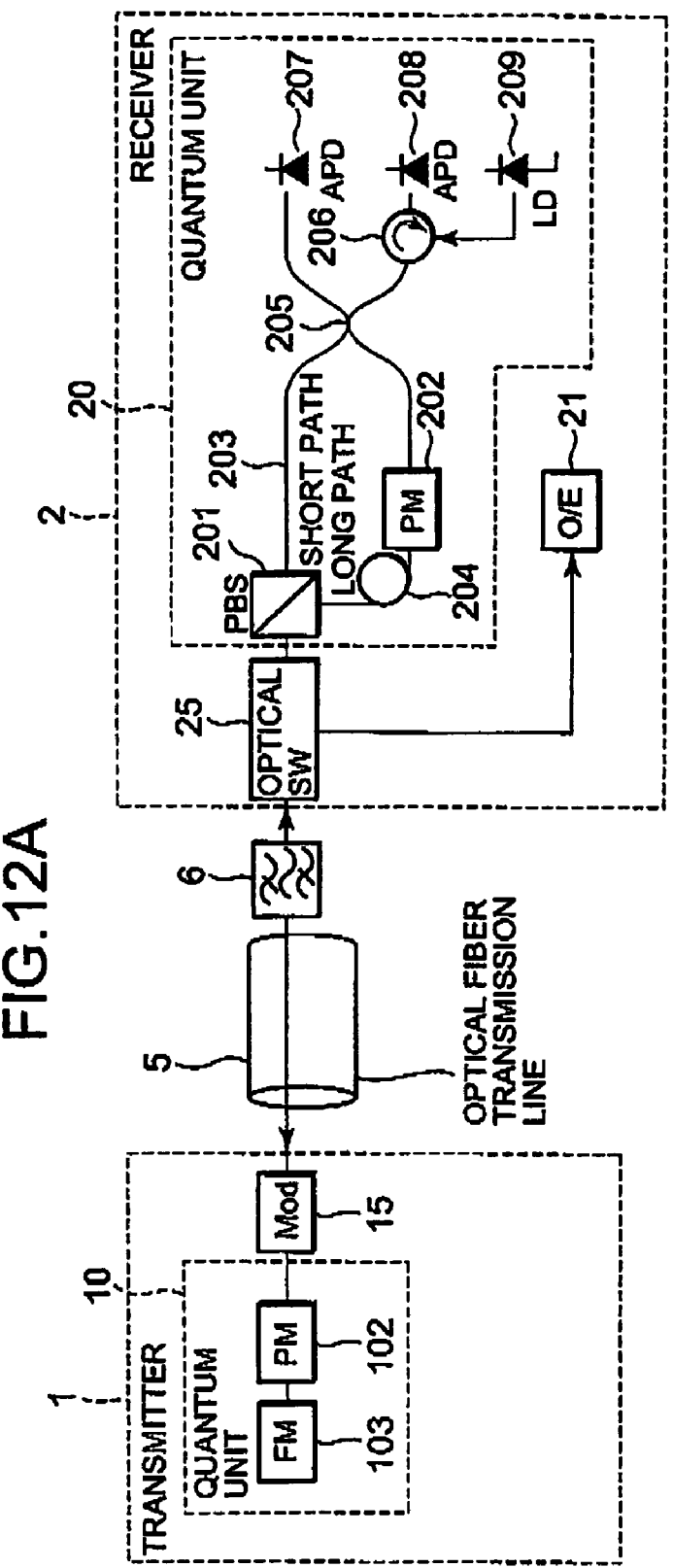
FIG. 12A is a block diagram showing a configuration of a quantum key distribution system according to a seventh embodiment of the present invention.
Figure 12B:
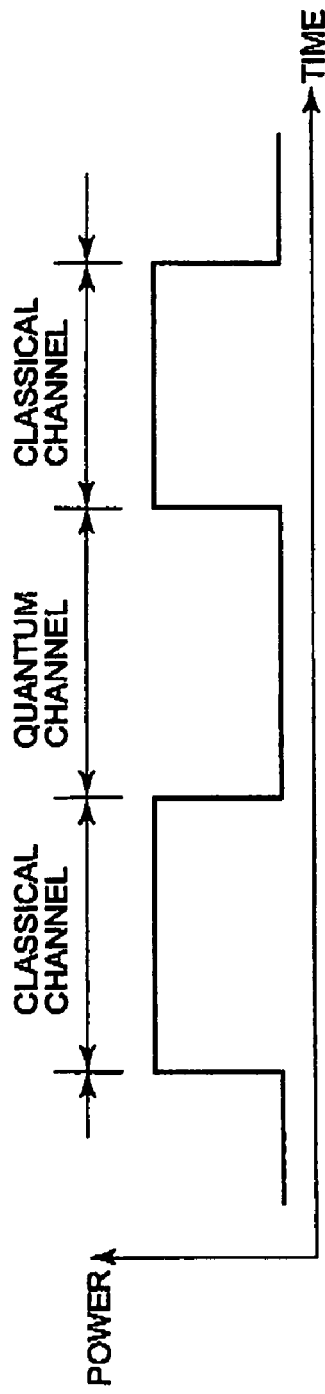
FIG. 12B is a waveform diagram for illustrating a power control operation of an intensity modulator provided to the transmitter in the quantum key distribution system according to the seventh embodiment.

FIG. 12A is a block diagram showing a configuration of a quantum key distribution system according to a seventh embodiment of the present invention, and FIG. 12B is a waveform diagram for illustrating a power control operation of an intensity modulator provided to the transmitter in the quantum key distribution system. Referring to FIG. 12A, the transmitter 1 is provided with the quantum unit 10 and an intensity modulator 15, and the receiver 2 is provided with the quantum unit 20, an optical switch 25 and the O/E 21. A band-pass filter 6, which will be described later, is placed between the optical transmission line 5 and the receiver 2. Note that the quantum units 10 and 20 of the seventh embodiment have substantially the same configurations and operations as those of the first embodiment shown in FIG. 2A.

As will be described later, the intensity modulator 15 provided to the transmitter 1 modulates the intensity of light outputted from the quantum unit 10 as shown in FIG. 12B and sends out a time-division multiplex signal onto the optical transmission line 5. The time-division multiplex signal has time slots of usually-used light intensity for the classical channel and time slots of weak light intensity for the quantum channel. The light intensity for the classical channel made by the intensity modulator 15 needs to be set such that the light does not affect the quantum channel by using the transmission characteristics of the band-pass filter 6 as described later and satisfies a necessary transmission distance. Note that the optical power on the classical channel and quantum channel is controlled as described in the first embodiment.

The time-division multiplex signal transmitted over the optical transmission line 5 passes through the band-pass filter 6 and enters the receiver 2. The band-pass filter 6 of the seventh embodiment has the transmission characteristic shown in FIG. 7C. The optical switch 25 switches the time-division multiplex signal, received through the band-pass filter 6, to the O/E 21 during the time for the classical channel, and to the quantum unit 20 during the time for the quantum channel.

7.2) Operation

First, the laser 209 outputs optical pulse P at a usually-used optical power level. The optical pulse P is outputted via the optical circulator 206 to the optical coupler 205, where the optical pulse P is split into two pulses. The split optical pulses P1 and P2 go along the short path 203 and the long path 204, respectively, and are sent to the transmitter 1 through the optical switch 25, band-pass filter 6 and optical transmission line 5.

At the transmitter 1, each of the optical pulses P1 and P2, received through the optical transmission line 5, passes through the intensity modulator 15 and is then returned by the faraday mirror 103 while its polarization state is rotated by 90 degrees. The returned optical pulse P1 is allowed to pass through the phase modulator 102 as it is and then outputted from the quantum unit 10, whereas the optical pulse P2 is modulated by the phase modulator 102 and outputted as optical pulse P2*$^a$ from the quantum unit 10.

The returned optical pulse P1 and the optical pulse P2*$^a$ thus sequentially outputted from the quantum unit 10 are sent onto the optical transmission line 5 at the quantum-channel time slots where the light intensity is made weak by the intensity modulator 15. At the classical-channel time slots, the optical pulses are sent onto the optical transmission line 5 as optical pulses with usually-used optical power. In this way, the light of the quantum channel and the light of the classical channel are multiplexed in the time division scheme by the intensity modulator 15, and the time-division multiplex signal propagates through the optical transmission line 5.

After transmitted through the optical transmission line 5, the time-division multiplex signal passes through the band-pass filter 6 with a passband width of 1 nm as shown in FIG. 7C and is demultiplexed into the quantum channel and the classical channel by the optical switch 25. The light of the quantum channel is received by the quantum unit 20, whereas the light of the classical channel is received by the E/O 21. The passband width of the band-pass filter 6 is set at 1 nm, which is determined, as in the first embodiment, depending on the spectrum of the laser 209, which is the light source for the quantum channel.

As described in the first embodiment, the light of the classical channel having propagated through the optical transmission line 5 comes to have the spectrum as shown in FIG. 5 due to the nonlinear optical effects. Even in time division multiplex transmission as in the seventh embodiment, the light of the classical channel may conceivably affect the quantum channel as residual light, at a transition portion between the classical channel and the quantum channel. For example, when the transmission rate of the quantum channel is 60 MHz, there is a possibility that residual light of the classical channel might leak into the quantum channel. If the light of the classical channel having the spectrum as shown in FIG. 5 remains and leaks into the quantum channel, the APDs 207 and 208 detect noise in a wide frequency range as described already, resulting in the SNR of the quantum channel being degraded.

However, according to the seventh embodiment, the band-pass filter 6 having the transmission characteristic as shown in FIG. 7C is inserted before the receiver 2, thereby eliminating noise light of the classical channel due to the nonlinear optical effects. Moreover, to enhance this effect, the intensity modulator 15 sets an intensity of the light of the classical channel. Thus, it is possible to improve the SNR of the quantum channel to be detected by the APDs 207 and 208.

As described hereinabove, according to the seventh embodiment, as in the first embodiment, the optical power on the classical channel is controlled by using the intensity modulator 15, and the transmission characteristic of the band-pass filter 6 are designed as described before, thereby suppressing noise light of the classical channel. Thus, it is possible to implement a quantum key distribution system of a time division multiplex type in which the classical channel does not affect the quantum channel.

8. Network Application Examples

Figure 13:
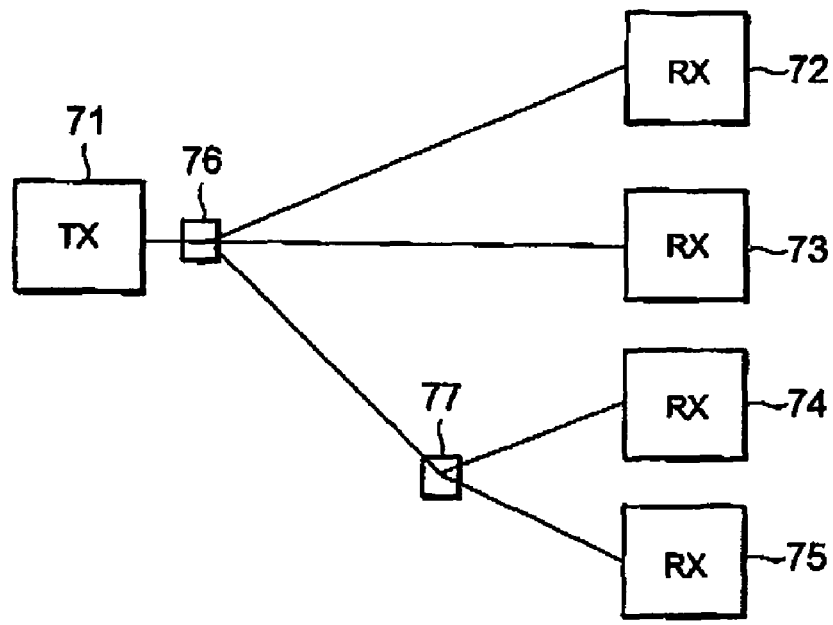
FIG. 13 is a block diagram showing an example of a network structure to which the quantum key distribution system according to the present invention is applied.

FIG. 13 is a block diagram showing an example of a network structure to which the quantum key distribution system according to the present invention is applied. A transmitter TX and a receiver RX are substantially the same as the transmitter 1 and receiver 2, respectively, according to any of the first to seventh embodiments of the present invention.

Here, there is illustrated a network in which one transmitter 71 is connected to a plurality of (N) receivers 72 to 75 in the form of a tree. The topology of the network is not only a tree but may be a star or a bus. Note that branching elements 76 and 77 may be any of an optical coupler and an optical switch that are passive elements. For example, quantum key distribution similar to the first embodiment or any other embodiment can be carried out between the transmitter 71 and any one of the receivers 72 to 75.

Figure 14:
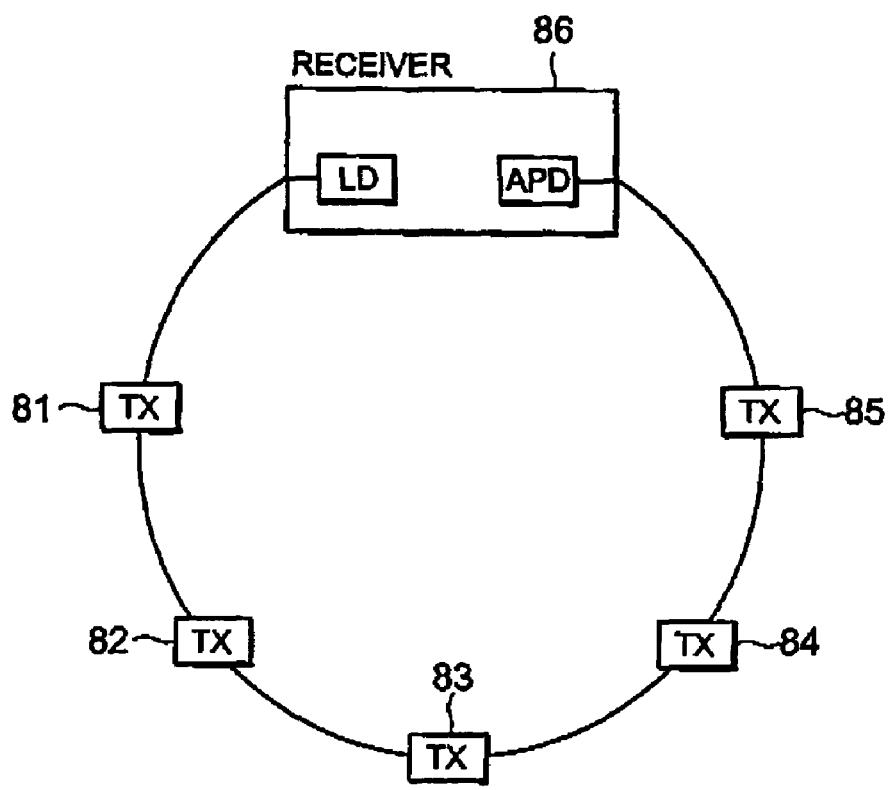
FIG. 14 is a block diagram showing another example of a network structure to which the quantum key distribution system according to the present invention is applied.

FIG. 14 is a block diagram showing another example of a network structure to which the quantum key distribution system according to the present invention is applied. Here, there is illustrated a network in which N transmitters 81 to 85 and one receiver 86 are connected in the form of a ring. The transmitter TX and receiver RX are substantially the same as the transmitter 1 and receiver 2, respectively, according to any of the first to seventh embodiments of the present invention.

9. Classical Channel Photo Detector

In the first to seventh embodiments as described above, the output power of a light source for each classical channel (E/O 11, 22, 13, 24) should be at such a level that the light of each classical channel does not affect the quantum channel by using the transmission characteristics of the wavelength MUX/DEMUXs 3 and 4 and achieves propagation over a necessary transmission distance (see FIG. 6). Accordingly, the photo detectors (O/E 21, 12, 14, 23) each corresponding to the classical channels are preferably highly sensitive. A high-sensitive photo detector allows the output power of a corresponding light source in the transmitting side to be relatively low, which effectively avoids causing occurrence of crosstalk from the classical channel. Such a high-sensitive photo detector may be realized by placing an optical amplifier before a photo diode or by using an avalanche photo diode (APD) as the high-sensitive photo detector.

Figure 15:
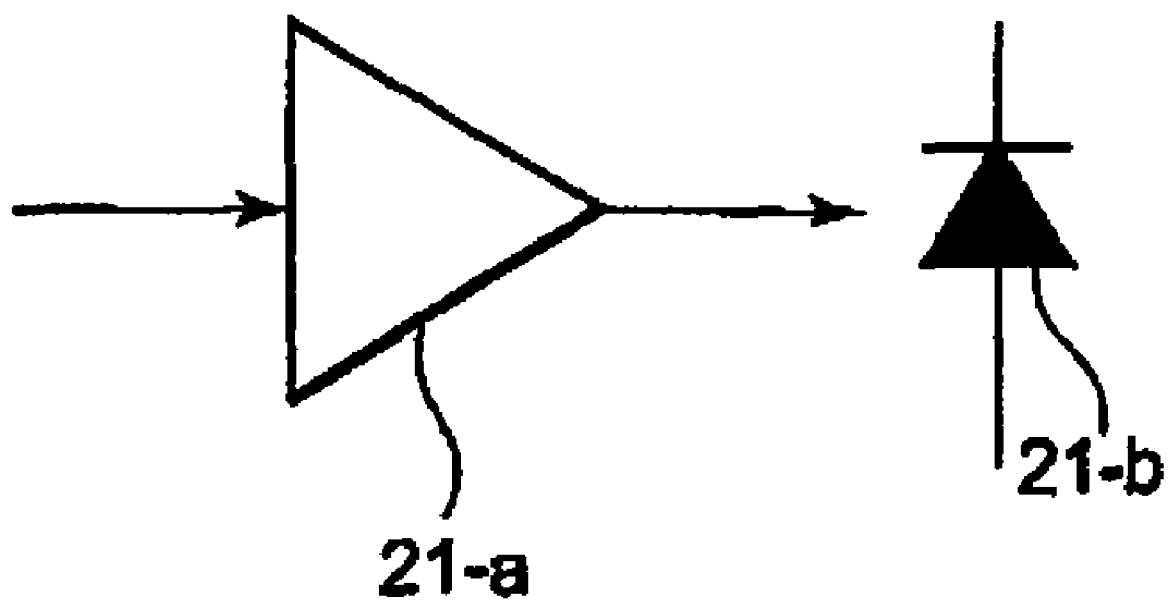
FIG. 15 is a block diagram showing an example of an optical-to-electrical converter preferably employed in each embodiment of the present invention.

FIG. 15 is a block diagram showing an example of a classical channel photo detector (O/E). In each embodiment as described above, the photo detector O/E 21 for a classical channel is designed such that an input optical signal is amplified by an EDFA (Erbium-doped fiber amplification) optical preamplifier 21-*a* and the amplified optical signal is converted into electrical by a PIN photo diode 21-*b*. Alternatively, as another example, an avalanche photo diode (APD) may be used to achieve a high-sensitive photo detector.

It should be noted that the present invention is applicable not only to two-way systems of the plug & play type as described above but also to one-way quantum key distribution systems. Moreover, the present invention is not limited to the quantum key distribution but is applicable to quantum communications in general as well as other general communication systems in which different optical power channels are multiplexed.

The invention claimed is:

1. An optical multiplexing communication system for transmitting information by multiplexing a plurality of communication channels on an optical transmission medium, wherein the plurality of communication channels include a first channel of a relatively small optical power state and a second channel of a relatively large optical power state, comprising:

a multiplexer for multiplexing the plurality of channels on the optical transmission medium; and a demultiplexer for demultiplexing multiplexed communication channels that have traveled through the optical transmission medium, to separate out at least the first channel from the multiplexed communication channels, wherein:

a second-channel transmission characteristic of the multiplexer for the second channel, a first-channel transmission characteristic of the demultiplexer for the first channel, and an optical power of the second channel are set so that the second channel does not affect the first channel, the second-channel transmission characteristic of the multiplexer comprises a first isolation from the first channel, wherein the first isolation is set such that crosstalk light due to spontaneous emission light of a light source for the second channel is suppressed to become smaller than optical power of signal light on the first channel, the first-channel transmission characteristic of the demultiplexer comprises a second isolation from the second channel and a transmission bandwidth for the first channel, wherein the second isolation is set such that crosstalk light due to nonlinear optical effects caused by propagation through the optical transmission medium is suppressed to become smaller than optical power of signal light on the first channel and the transmission bandwidth is set to a bandwidth not greater than a predetermined value within such a range that optical power of the crosstalk light due to nonlinear optical effects does not affect a spectrum of the first channel, and the demultiplexer comprises:
 a first separator for separating out a first optical signal on at least the first channel from the multiplexed communication channels according to a first transmission characteristic; and
 a second separator for separating out a second optical signal on the first channel from the first optical signal according to a second transmission characteristic, wherein the first transmission characteristic provides the second isolation from the second channel and the second transmission characteristic provides the transmission bandwidth.

2. The optical multiplexing communication system according to claim 1, wherein
 the second-channel transmission characteristic of the multiplexer is set so as to suppress noise components of an optical signal on the second channel inputted to the multiplexer,
 the first-channel transmission characteristic of the demultiplexer is set so as to suppress noise components of an optical signal on the second channel generated due to propagation of the optical signal on the second channel through the optical transmission medium, and
 the optical power of the second channel is set to a predetermined value or more in such a range that noise components of the first channel are reduced within a predetermined permissible range.

3. The optical multiplexing communication system according to claim 1, wherein the optical power of the second channel is determined depending on the second-channel transmission characteristic of the multiplexer, the first-channel transmission characteristic of the demultiplexer, and a transmission distance.

4. The optical multiplexing communication system according to claim 1, wherein the relatively small optical power state of the first channel is one photon per bit or less.

5. A crosstalk elimination method in an optical multiplexing communication system for transmitting information by multiplexing a plurality of communication channels on an optical transmission medium, wherein the plurality of communication channels include a first channel of a relatively small optical power state and a second channel of a relatively large optical power state, the method comprising:
 multiplexing the plurality of communication channels on the optical transmission medium so that the second channel does not affect the first channel;
 causing light on the first channel to pass through among light that has traveled through the optical transmission medium under a predetermined transmission characteristic so that the second channel does not affect the first channel;
 separating out a first optical signal on at least the first channel from the multiplexed communication channels according to a first transmission characteristic;
 separating out a second optical signal on the first channel from the first optical signal according to a second transmission characteristic; and
 setting an optical power of the second channel to such a range that the second channel does not affect the first channel in the light that have traveled through the optical transmission medium, wherein:
 a transmission characteristic for the second channel when multiplexing comprises a first isolation from the first channel, wherein the first isolation is set such that crosstalk light due to spontaneous emission light of a light source for the second channel is suppressed to be smaller than optical power of signal light on the first channel,
 the predetermined transmission characteristic comprises a second isolation from the second channel and a transmission bandwidth for the first channel, wherein the second isolation is set such that crosstalk light due to nonlinear optical effects caused by propagation through the optical transmission medium is suppressed to be smaller than optical power of signal light on the first channel and the transmission bandwidth is set to a bandwidth not greater than a predetermined value within such a range that optical power of the crosstalk light due to nonlinear optical effects does not affect a spectrum of the first channel, and
 the first transmission characteristic provides the second isolation from the second channel and the second transmission characteristic provides the transmission bandwidth.

6. The crosstalk elimination method according to claim 5, wherein
 a transmission characteristic for the second channel when multiplexing is set so as to suppress noise components of an optical signal on the second channel,
 the predetermined transmission characteristic is set so as to suppress noise components of an optical signal on the second channel generated due to propagation of the optical signal on the second channel through the optical transmission medium, and
 the optical power of the second channel is set to a predetermined value or more in such a range that noise components of the first channel are reduced within a predetermined permissible range.

7. The crosstalk elimination method according to claim 5, wherein the plurality of communication channels are wavelength-division multiplexed on the optical transmission medium.

8. The crosstalk elimination method according to claim 5, wherein the plurality of communication channels are time-division multiplexed on the optical transmission medium by sequentially setting optical power of an output signal to a selected one of the relatively small optical power of the first channel and the relatively large optical power of the second channel to output the output signal to the optical transmission medium.

* * * * *